United States Patent
Chang et al.

(10) Patent No.: US 7,912,503 B2
(45) Date of Patent: Mar. 22, 2011

(54) SMART INTERFACE SYSTEM FOR MOBILE COMMUNICATIONS DEVICES

(75) Inventors: Eric Chang, Beijing (CN); David Dehghan, Sammamish, WA (US); Stanley Sun, Beijing (CN); Bin Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 11/952,152

(22) Filed: Dec. 7, 2007

(65) Prior Publication Data

US 2009/0023475 A1  Jan. 22, 2009

Related U.S. Application Data

(60) Provisional application No. 60/959,732, filed on Jul. 16, 2007.

(51) Int. Cl.
*H04B 1/38* (2006.01)
(52) U.S. Cl. .............. 455/557; 455/558; 455/552.1; 455/90.2
(58) Field of Classification Search .............. 455/550.1, 455/3.05, 552.1, 557, 556.1, 558, 556.2, 455/559, 90.2, 90.1, 418, 419
See application file for complete search history.

(56) References Cited

U.S. PATENT DOCUMENTS

| | | | |
|---|---|---|---|
| 5,497,339 A * | 3/1996 | Bernard | 708/109 |
| 5,675,524 A * | 10/1997 | Bernard | 708/109 |
| 6,286,060 B1 * | 9/2001 | DiGiorgio et al. | 710/31 |
| 6,446,127 B1 | 9/2002 | Schuster et al. | |
| 6,625,472 B1 | 9/2003 | Farazmandnia et al. | |
| 6,980,546 B2 | 12/2005 | Purpura et al. | |
| 7,177,597 B2 | 2/2007 | Jung et al. | |
| 2002/0103008 A1 | 8/2002 | Rahn et al. | |
| 2004/0097127 A1 | 5/2004 | Smith et al. | |
| 2004/0204074 A1 | 10/2004 | Desai | |
| 2006/0259942 A1 | 11/2006 | Toyama et al. | |
| 2007/0005840 A1 | 1/2007 | Cheng et al. | |
| 2007/0021148 A1 | 1/2007 | Mahini | |
| 2007/0038785 A1 | 2/2007 | Varanda et al. | |
| 2007/0130592 A1 | 6/2007 | Haeusel | |
| 2007/0136264 A1 | 6/2007 | Tran | |

FOREIGN PATENT DOCUMENTS

| WO | WO0209023 A1 | 1/2002 |
|---|---|---|
| WO | WO03065227 A1 | 8/2003 |

OTHER PUBLICATIONS

International Search Report, mailed Jan. 29, 2009, 13 pages.
Bostwick et al., "Innovative User Interfaces that use Mobile Devices at the Same Time as PCs", retrieved at <<http:www.teco.edu/chi2000ws/papers/31_myers.htm>>, pp. 4.
Bennani, "Integrating a Digital Camera in the Home Environment: Architecture and Prototype", vol. 4, No. 1, 2001, Tamkang Journal of Science and Engineering, pp. 1-8.

* cited by examiner

*Primary Examiner* — John Lee

(57) ABSTRACT

A universal smart interface and peripheral management system for portable devices such as mobile phones. The smart system includes a connector interface that connects peripherals to a phone and/or personal digital assistant (PDA), through the smart system. The smart system includes a cradle for receiving a cell phone and interfacing the phone to external systems such as peripherals, networks and other systems through a USB hub and other suitable connector interfaces. The peripheral devices to which the smart system can interface include, but are not limited to, large displays (e.g., television), external monitors, input devices such as mice and keyboards, external storage devices, and networks (wired and/or wireless). The smart system also facilitates connectivity to large display systems such as TVs, computer displays and monitors.

20 Claims, 17 Drawing Sheets

SMART INTERFACE SYSTEM FOR MOBILE COMMUNICATIONS DEVICES

CROSS-REFERENCE TO RELATED APPLICATIONS

This application claims the benefit of U.S. Provisional Patent application Ser. No. 60/959,732 entitled "PORTABLE DEVICE MULTIPLE INTERFACE HUB" and filed Jul. 16, 2007, the entirety of which is incorporated by reference herein. This application is related to co-pending U.S. patent application Ser. No. 11/968,195 entitled "PASSIVE INTERFACE AND SOFTWARE CONFIGURATION FOR PORTABLE DEVICES" filed on Jan. 2, 2008.

BACKGROUND

Mobile communications devices such as cell phones are ubiquitous in personal and business settings. Advances in the design and computing capabilities of such devices serve as the catalyst for demanding more access to these capabilities by consumers. For example, cameras, text messaging, display systems are some features provided in addition to the basic call functionality originally provided for such devices. Moreover, the ability to now connect to services on both IP and cellular communications networks further drives the demand for more systems that provide convenient access to these services and functionality.

This becomes particularly desirable in emerging markets where the average user may have a handheld mobile communications device but not a home computer. This is because voice communications between users may typically be considered more valuable to the user than a computing system. Moreover, the cost of cell phones is significantly less than computing systems at many levels. For example, the phones can be obtained for free or at a nominal cost based on the dialing plan to which the user subscribes. However, the cell phone is rapidly evolving into a smart communications device that can provide sufficient computing power and functionality to drive a wide variety of peripherals as well as access network services. A major impediment to taking advantage of this evolving technology in the cell phone, for example, is the inability to connect the phone to peripheral devices and systems.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed mechanism is a multipurpose smart system (or interface system) that functions to connect a mobile communications device (e.g., a cell phone) or data device (e.g., PDA) to different peripheral devices (e.g., printers, displays, input devices, external storage entities, etc.) and networks (e.g., IP network, home networks, etc.).

The smart system includes a housing having a cradle portion into which the mobile communications device can be seated. When seated in the cradle, the mobile communications device mechanically and electrically engages the functionality of the smart system. The cradle is designed into the housing such that when seated in the cradle, the mobile communications device is positioned and oriented for convenient user interaction with an optimum number of features such as the keypad, device display, audio output (e.g., speakers), audio input (e.g., microphone), device camera (e.g., lens for capturing images), and so on.

In an alternative embodiment, the mobile communications device is not seated into the cradle of the smart system, but interfaces to the smart system using a tether (e.g., mini-USB cable) via which the device user has more freedom to move the device.

In still another embodiment, the mobile communications device interfaces to the smart system and associated functionality via a wireless link (e.g., Bluetooth™, Wi-Fi, Wi-Max, IrDA, etc.).

The smart system provides a set of standard modular connectors for a wide variety of peripheral systems. The smart system includes a USB hub subsystem having a set of USB ports and controller for managing connections to USB-capable devices. The smart system also includes a physical network connection (e.g., Ethernet) for connecting to IP networks, for example. The USB and/or the network connection facilitate interconnecting one mobile device to another through the smart system, and/or through multiple systems.

The peripheral devices to which the hub can interface include, but are not limited to, large displays, external monitors (e.g., television), input devices such as mice and keyboards, external storage devices, and networks (wired and/or wireless). Adding these peripherals allows the user to fully take advantage of the computing resources of the mobile communications device phone.

When seated into the smart system cradle, the mobile communications device automatically configures itself to not only operate with the smart system but also with peripheral systems connected to the smart system. An application and driver installed on the mobile communications device facilitates interaction with the functionality of the smart system and the connected peripherals, as well as the smart system and peripherals receiving information about the connected device.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
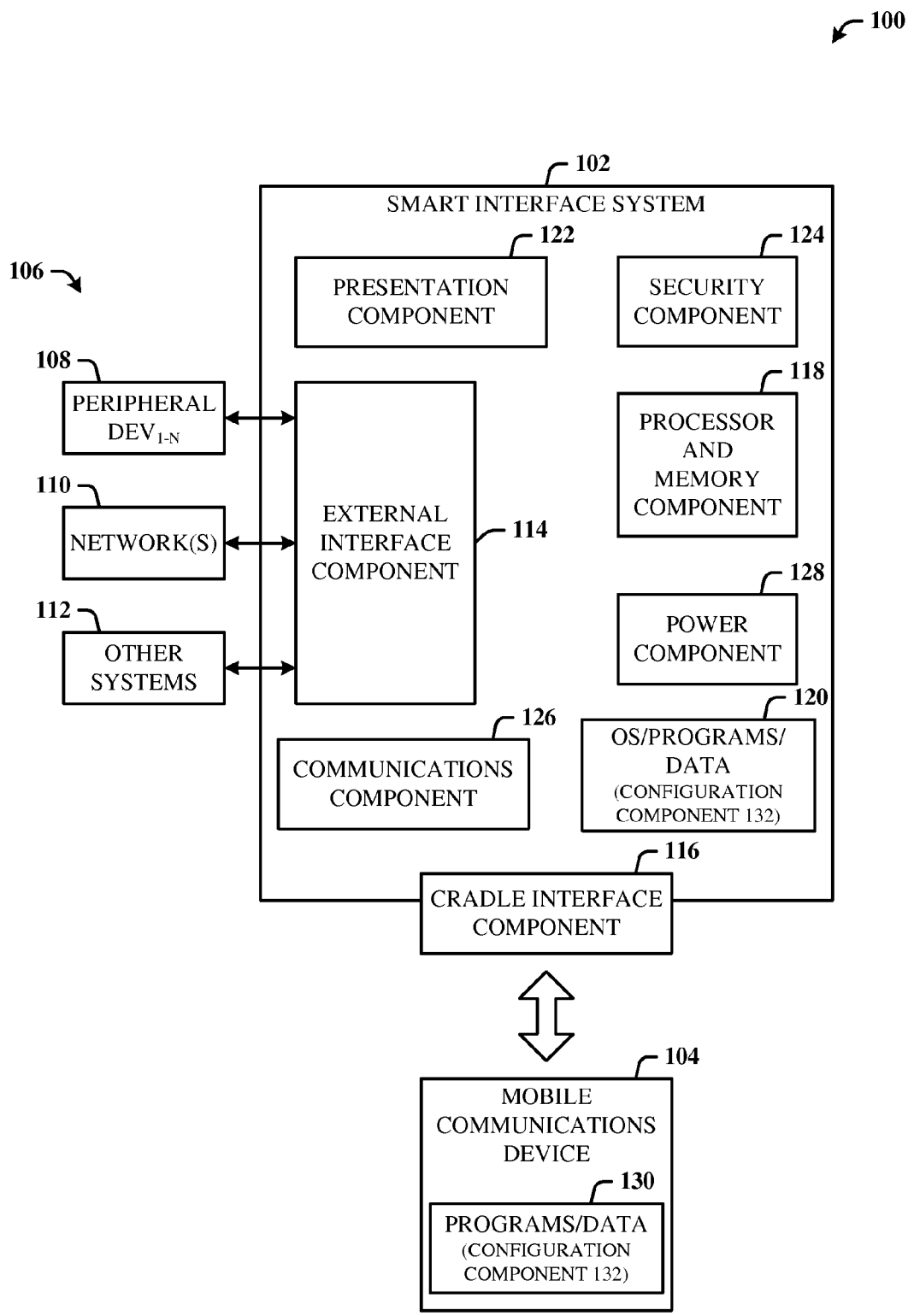
FIG. 1 illustrates a diagram of an exemplary smart interface environment.

The disclosed mechanism is a smart interface system (also referred to as a smart system or interface system) for at least a mobile communications device such as a cell phone and PDA having mobile communication functionality. The smart interface system includes a cradle for receiving a compatible mobile communications device and connecting the mobile communications device to external systems by controlling and/or interacting with the external systems via simulating a computer. Thus, the external systems will function as if the connection to the smart system is a computer when in effect the peripherals are connected to the mobile communications device which typically has limited computing capability. Note that although described in the context of using a mobile communications device, the smart interface system can provide enhanced functionality for a data device (e.g., PDA), MP3 player, MP4 video player, game controller, etc.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a diagram of an exemplary smart interface environment 100. The environment 100 includes a smart interface system 102 for interfacing a mobile communications device 104 to external systems 106. The external systems 106 can include peripheral devices 108, networks 110, and other systems 112. The peripheral devices 108 can include televisions (TVs), monitors, displays (e.g., LCD, LED, etc.), projectors, mice, keyboards, gesture input systems, touchpads, touch screen displays, and other human interface devices (HIDs). The peripheral devices 108 can also include printers, cameras, audio and audio processing systems (e.g., speakers, electronic music systems, etc.), image/video and image/video processing systems (e.g., video cameras, digital cameras, scanners, etc.), and storage systems (e.g., USB (universal serial bus) drives, IEEE 1394 drives, external drives, flash drives, etc.), for example. The networks 110 include the IEEE 802 family of wire and wireless networks. The other systems 112 can include set-top-boxes (e.g., cable TV boxes), high-definition systems, home theater systems, security systems, sensor systems, sensor systems (e.g., temperature, humidity, pressure, time, etc.) for example.

The smart system 102 includes an external interface component 114 for interfacing the mobile communications device 104 to the external systems 106. Accordingly, the external interface component 114 includes the hardware and/or software for handling the protocols and signals for the external systems 106. For example, if a projector is connected as one of the peripheral devices 108, the external interface component 114 will handle the basic communications (e.g., protocols and signals) between the projector and smart system 102. This will be in cooperation with a processor and memory component 118 of the smart system 102.

A cradle interface component 116 (also referred to as the cradle) facilitates the mechanical and electrical engagement of the mobile communications device 104 to the smart system 102. The cradle component 116 includes the guides and connectors (e.g., power, data, and signal) for making a secure insertion and engagement of the mobile communications device 104 to the smart system 102. The design of the cradle interface component 116 (which includes the cradle subsystem and cradle slot in the housing of the smart system 102) for receiving the mobile communications device 104 facilitates the upright orientation and positioning of the mobile communications device 104 when seated in the smart system 102 for convenient user interaction with an optimum number of features such as the keypad, device display, audio output (e.g., speakers), audio input (e.g., microphone), device camera (e.g., lens for capturing images) and so on.

Once properly seated (e.g., electrically coupled), the smart system 102 auto-detects the presence of the mobile communications device 104 and security processing can begin to ensure that exposure of the smart system functionality is proper and authorized. Once properly authorized, the mobile communications device 104 can obtain full access to the smart system components and the external systems 106 connected or in communication therewith.

In an alternative embodiment, if access by the mobile communications device 104 to the smart system 102 is deemed unauthorized, the smart system 102 can be configured to expose only a low-level or minimum set of functionality such that the user of the mobile communications device 104 can be notified to disconnect or guided as to how to obtain full functionality of the smart system 102. For example, if unauthorized, the mobile communications device 104 can be allowed a basic Internet access to a website that walks the user though a process for obtaining full access. Another example includes allowing limited printer access to printout instructions or other information when the mobile communications device 104 is deemed to be unauthorized. In yet another example, when seated and detected to be in the cradle slot, but deemed unauthorized, the smart system 102 can cause information to be printed to a connected printer that instructs the user of the problem and how to correct it. As will be described further below, the smart system 102 can also present status information to the user via the mobile communications device 104 display or a smart system display.

The processor and memory component 118 can store and execute an operating system (OS), data, and programs 120, and process the OS, data, and programs 120 and signals in support of communications between the mobile communications device 104, the smart system 102, and external systems 106. The OS facilitates booting the smart system 102, file management, browsing, computational capability, etc., by the smart interface system 102. The OS can be a lightweight program rather than a full-feature OS for application and device support typically employed with computers; however, this is not to be construed as limiting in any way in that it is within contemplation that a full-feature OS could be employed for the desired purposes. The onboard memory aspect of the processor and memory component 118 can include built-in and/or removable flash memory for storing the programs and data, ROM, micro-drives, solid-state drives (SSDs), etc.

A presentation component 122 provides presentation capabilities related to, for example, text, images, audio, video, graphics, alerts, etc. In other words, the smart system 102 can include a display (e.g., CRT, LCD) and indicators (e.g., LEDs) for presenting information ranging from low-resolution to high-resolution multimedia related not only to operation and functionality of the smart system 102, but also of connectivity status and functionality related to the external systems 106 and the mobile communications device 104. The presentation system 122 facilitates a user interface for interacting with the functionality of the smart system 102.

The audio aspect of the presentation component 122 facilitates audio output ranging from operational beeps and alerts to voice output associated with telephone calls to the paying of audio files and audio channels of video clips, and so on. This can also include the implementation of a microphone as part of the presentation component 122 for direct voice input to the smart system 102 rather than the mobile communications device 104. Switching between the microphone input of the smart system 102 and the microphone input of the mobile communications device 104, for example, and the configuration management (and auto-detection) of other smart system components and subsystems is described in more detail herein below.

The smart system 102 can also include a security component 124 for providing access security not only to the smart system functionality and components, but also to the external systems 106 and the mobile communications device 104. For example, the security component 124 can facilitate the generation and exchange of private keys between the mobile communications device 104 and the smart system 102 for the encryption of communications. The encryption can be only between the smart system 102 and the mobile communications device 104, between the smart system 102 and one or more of the external systems 106 and/or from the mobile communications device 104 to the smart system 102 to one or more of the external systems 106.

The smart system 102 includes a communications component 126 for communicating the data and signals between the mobile communications device 104 and the external systems 106. The communications component 126 includes transceivers and/or modulation logic for transmitting and receiving in a wired and/or wireless manner. For example, when disengaged from the cradle interface component 116, the mobile communications device 104 can communicate with the smart system 102 via short-range wireless technologies (e.g., Bluetooth). It is also within contemplation of the subject architecture that when the mobile communications device 104 is engaged in the cradle, the mobile communications device 104 can obtain the full functionality of the smart system 102 while also communicating with the smart system 102 through a wireless Bluetooth headset, for example. This provides for VoIP (voice-over-IP) capability by processing voice signals through the smart system 102 to IP networks. Such capability can further be facilitated using a VoIP phone, for example, that tethers to the smart system 102 via the external interface component 114 rather than via the cradle 116.

The communications component 126 can also be used for wireless security. For example, an RFID (radio frequency identification) chip mounted in the smart system 102 can be scanned by an RFID reader in the mobile communications device 104 to receive an encryption code that then will be used to encrypt communications of the authorized user. Alternatively, the mobile communications device 104 has an embedded RFID passive sensor that when brought into range of the smart system 102, is activated by an RFID reader of the smart systems 102 to extract a code and other information stored in the RFID chip. The data stored in the RFID chip can then be used by the smart system 102 to access a network service via the networks 110 and determine if the mobile communications device 104 is authorized to access full functionality of the smart system 102.

The smart system 102 can also include a power component 128 for providing onboard power to the smart system components and connected devices (e.g., the mobile communications device and/or PDA 104, peripheral devices 108, etc.). The power component 128 can include a battery subsystem for battery backup, a converter subsystem for converting line voltage (US or international) to the proper voltage used by the smart system 102. The power component 128 can also include a charger subsystem for charging the smart system batteries. The power component 128 can also charge the mobile communications device 104 when seated in the cradle 116. The charging can be directed over power lines engaged through the cradle into the mobile communications device 104 and/or a wireless power induction coupling subsystem that charges the batteries of the mobile communications device 104 when in close proximity to the smart system 102. In one implementation, this can be managed based on whether the mobile communications device 104 is authorized to access the smart system 102. If not authorized, no charging will be allowed. Alternatively, if not authorized, the low-level capabilities yet allowed to the mobile communications device 104 can include charging of the device 104 batteries.

The programs 120 can include applications, drivers and settings for operating the smart system components and subsystems and also for interfacing to a wide variety of the external systems 106. For example, the programs 120 can include drivers for popular printers, displays, serial interface protocols, user preferences, user information, settings and drivers for mobile communications devices (e.g., cell phones, PDAs with mobile functionality) and other devices that can connect to the smart system 102 through the cradle or a tether).

The programs and data 120 of the smart system 102 function as part of a configuration component 132 for automatically sensing the mobile communications device 104 (whether seated in the cradle, tethered or in close proximity for short-range communications and/or RFID processing), and establishing operability between the mobile communications device 104 and the external systems 106 (e.g., peripheral devices and networks). The term operability is intended to mean the exercise of at least a basic set of instructions, protocols, and/or signals for accessing functionality and data offered by the external systems 106. The configuration component 132 automatically senses the capabilities of the mobile communications device 104, and instantiates additional functionality in the smart interface system 102 to provide additional feature access in the peripheral devices 108 and the network 110, for example, by the mobile communications device 104.

The mobile communications device 104 also includes programs/data 130 considered herein as part of the functionality of the configuration component 132. In other words, the programs/data 120 of the smart system 102 and the programs/data 130 of the mobile communications device 104 can work together or separately as the configuration component 132 to provide the capabilities described herein with respect to the smart system 102, external systems 106, and/or mobile communications device 104.

In one embodiment, once the mobile communications device 104 detects the presence of the smart system 102 (e.g., via slot insertion and seating, wireless communications, tethering, etc.), applications and drivers installed as part of the program component 130 on the mobile communications device 104 for interacting with the smart system 102 will auto-configure one or more operating characteristics of the mobile communications device 104 in accordance with the connected external systems 106 and/or capabilities of the smart system 102. For example, once the mobile communications device 104 has engaged full functionality of the smart system 102, the configuration component 132 of the mobile communications device 104 can automatically change the behavior or operating characteristics of certain subsystems of the mobile communications device 104. For example, if a large display is connected as one of the peripheral devices 108, the configuration component 132 can auto-configure and route the display functions and output of the mobile communications device 104 to the large display, thereby driving the large display and/or the display of the mobile communications device 104.

In an alternative embodiment, once the mobile communications device 104 is detected such that communications occurs between the smart system 102 and the mobile communications device 104, the configuration aspect of the smart system 102 can automatically change the behavior or operating characteristics of the mobile communications device 104 subsystems thereby allowing the mobile communications device 104 to sufficiently drive one or more of the connected external systems 106.

The smart system 102 can operate independently of the mobile communications device 104 for uploading and downloading of data, information, drivers, and programs. In other words, the smart system 102 can be configured to automatically connect to one or more of the networks 110 (e.g., IP network, ad hoc network) to access services that provide updated information. For example, if a display has an updated driver for download, the smart system 102 can auto-connect with a website or other data source to download the driver for installation on the smart system 102. This process applies to some or all of the external systems 106, as well as the internal components and subsystems (e.g., download and store audio files, video files, user preferences, links, webpages, documents, etc.). The smart system 102 can also download data and information from the mobile communications device 104 such as audio files, documents, settings, user profiles and preferences, etc.

Additionally, the smart system 102 can be configured to upload data and information to a remote source. For example, log files related to use of the smart system 102 and/or external systems 106 can be created and uploaded to a corporate enterprise, a website, and/or the mobile communications device 104.

The smart system 102 and associated functionality can be designed and packaged as a modular system for insertion into other components, systems, and/or environments. For example, the smart system 102 can be built into a chassis, wall, panel, other hardware, etc., in buildings, vehicles, appliances, computers, PSTN (public switch telephone network) phones and VoIP phones, and so on.

Figure 2:
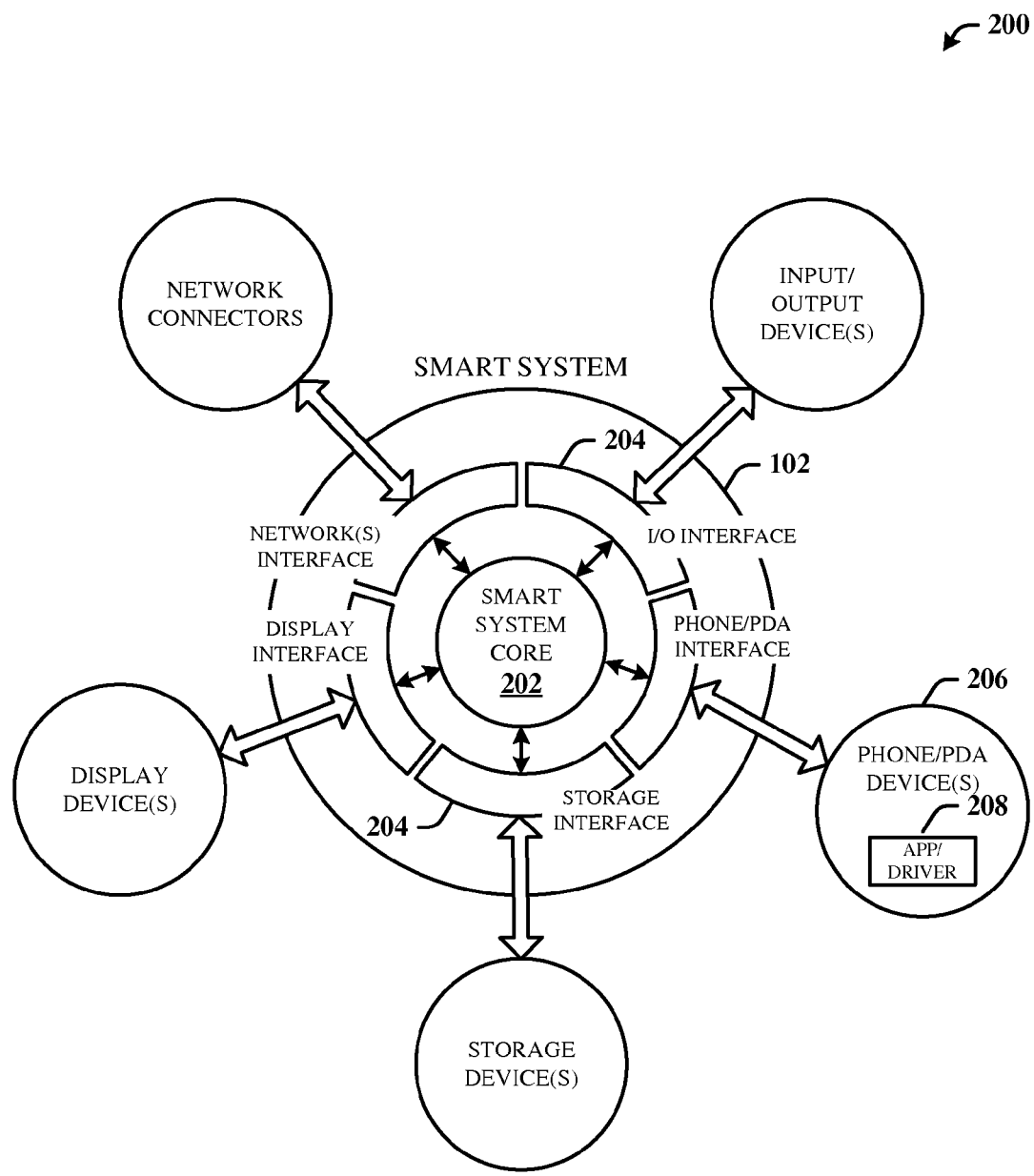
FIG. 2 illustrates an alternative representation of the smart system of FIG. 1.

FIG. 2 illustrates an alternative representation 200 of the smart system 102 of FIG. 1. The representation 200 shows the smart system 102 as having a smart system core 202 that represents the internal components, functionality, and subsystems of FIG. 1. The smart system core 202 includes the circuits, logic, hardware and software for receiving, processing, and transmitting data and/or signals via one or more interfaces 204. For example, the interfaces 204 can include a phone/PDA interface (that includes the cradle) for connecting such devices to the smart system core 202, a display interface for connecting to one or more display devices (e.g., TV, monitor, digital display, projectors, etc.), a storage interface for connecting to storage devices using different serial and/or parallel technologies (e.g., USB, IEEE 1394, wireless, infrared, USB flash memory stubs, solid state drives, external mass storage drives, flash drives, etc.), an input/output (I/O) interface for similar types of devices that facilitate user interaction (e.g., mouse, keyboard, touchpad, gesture system, etc.) and peripheral devices (e.g., printers, copiers, scanners, cameras, etc.) and, a network interface for different types of wire/wireless networks (e.g., Ethernet, unlicensed, licensed, Wi-Fi, WiMax, Bluetooth, etc.). Other conventional types of interfaces can be employed as well.

The core 202 handles all the complex tasks associated with simulating a PC interface for the peripherals. Whether a phone or PDA 206, for example, are operatively connected to the smart system 102 or not, the external systems do not need to fully be aware of this, and thus, function as if being controlled by the smart system 102, rather than the phone or PDA 206. The smart system 102 has the capability to query the phone or PDA 206 for device specifications, and then self-configure itself to match the capability of the phone or PDA 206.

Optionally, the mobile device, represented here as the phone/PDA 206, and/or other suitable devices, can install application/driver software 208 that handles the tasks associated with simulating a computer interface for the external systems. The application and driver 208 can be installed on many different devices (e.g., phones) that have suitable hardware support for connecting to the peripherals. The application/driver 208 also has the capability of querying the phone/PDA 206 and/or other smart devices in order to self-configure to match the capability of the external devices connected through the smart system 102.

In the context of the mobile communications device being a cell phone, depending on the capability of the phone, for example, the smart system 102 can utilize the phone as either a network connection or a computing element. For example, the phone itself can perform computations and processing for document processing, Internet browsing, and media playback. In another instantiation, the phone may only have the basic capability of connecting to voice and data networks. In that case, the smart system 102 can include computing capabilities which allow the smart system 102 to provide document processing, Internet browsing and media playback capabilities on behalf of the phone.

Where the phone connects to the smart system 102 via the cradle subsystem, the phone connector in the cradle abstracts the complexity of different type of phones from the smart system core 202. In one embodiment, there can be two types of phone interfaces: phone interfaces that work with feature phones or other closed systems—a standard connector interface and protocol can be defined, and whichever feature phone manufacture implements that interface will benefit from interoperability with smart system; and, phone interface drivers for smart devices—this software or driver component is installed and runs on the phone, and simulates a smart system phone connector protocol, and therefore, allows any type of smart phone to interoperate with smart system 102 (e.g., cradled, tethered, wireless, etc.).

The storage interface abstracts the complexity of different types of storage from the smart system core 202. For example, the storage interface is compatible with the following type of storage systems: MMC (multi-media Card), CF (compact flash), SD/MiniSD/MicroSD (secure digital), and USB mass storage (or any other storage device that can support a USB connection).

The display interface abstracts the complexity of different type of displays from the smart system core 202. Examples of display interfaces for displays include RCA composite, VGA, S-video, HDMI (high-definition multimedia interface), and electronic paper display. The display interface can allow multiple types of displays to be connected concurrently to the smart system 102 and the phone/PDA 206 at the same time. These display devices can also have different screen resolutions. The smart system 102 can query the displays and collect information about display specification and capabilities, and hand off this information to the phone/PDA 206 connected at the time.

The network interface abstracts the complexity of different types of network connections from the smart system core 202. Example types of inter-device communications include, but are not limited to, infrared (e.g., IrDA), Bluetooth, Wi-Fi, Ethernet, Wireless USB, and WiMax.

Figure 3:
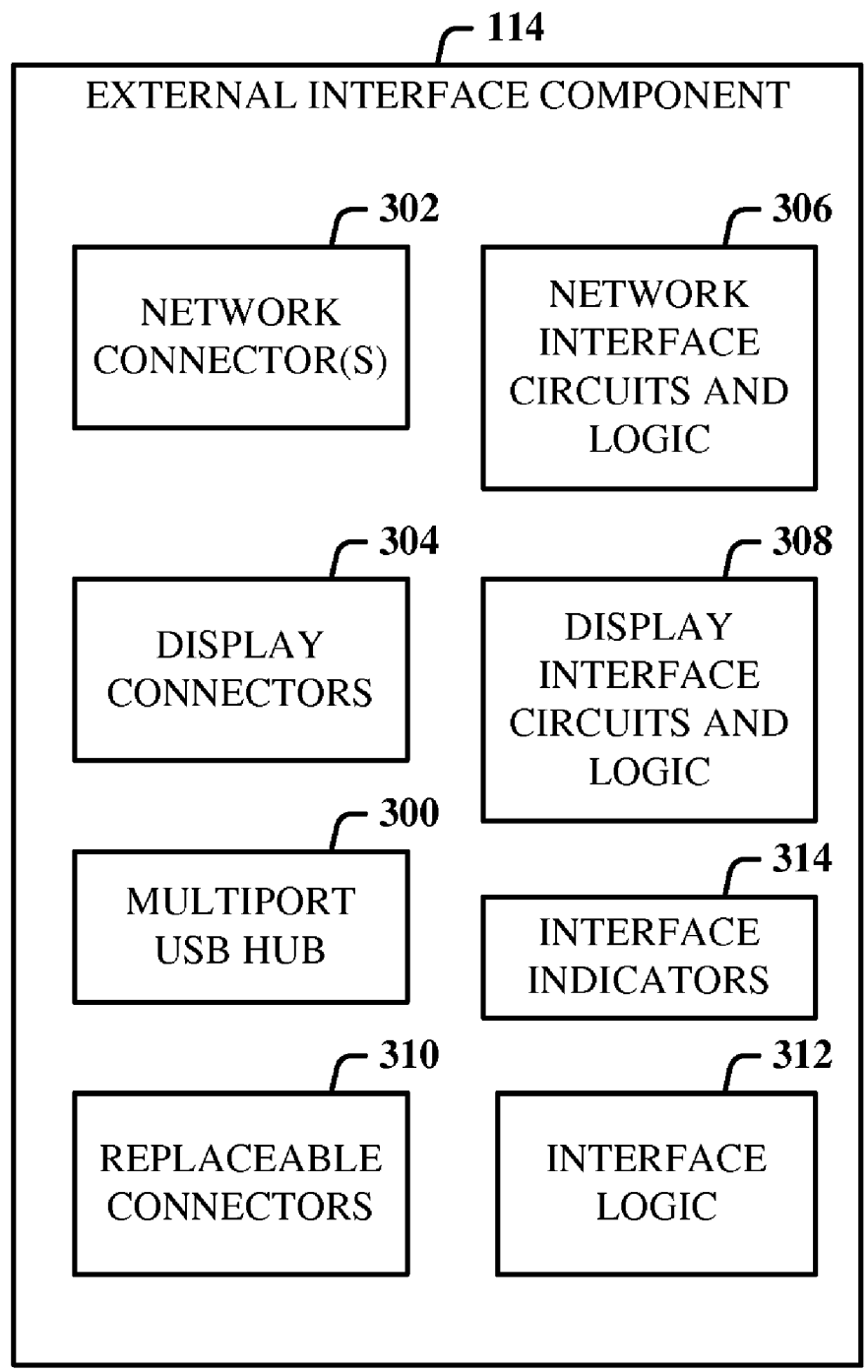
FIG. 3 illustrates a more detailed block diagram of the external interface component.

FIG. 3 illustrates a more detailed block diagram of the external interface component 114. The interface component 114 can include a basic default set of built-in connections for commonly used devices and systems interfaces. For example, a multiport USB hub 300 (e.g., three ports) can be included for the large number of USB devices in the market, one or more network connectors 302 (e.g., one Ethernet) and one or more common display connectors 304 (e.g., VGA or USB). Associated with this basic set of connectors can be associated interface circuits and logic. For example, network interface circuits and logic 306 can be used for providing the proper signal levels and timing for the network connectors and associated network signals and data protocols, and a display interface circuits and logic 308 can be used for providing the proper signal levels and timing for the more common display types (e.g., LCD, VGA, etc.). The USB hub 300 can include the control logic for the proper signal levels and protocols used for USB devices.

Optionally, the interface component 114 (and smart system housing) can be designed to accommodate replaceable connectors 310 (for extra interface compatibility) that can be removed and replaced as needed. For example, if a particular peripheral device such as a cable TV box will only accommodate a special type connector, the vendor can supply a compatible connector type that is insertable into the smart system housing. In another example, if an additional USB port is needed, the replaceable connectors 310 can accommodate this by installing a removable USB add-on port. Additional interface logic 312 can then be employed to accommodate these specialty add-ons (e.g., IEEE 1394 port).

Figure 4:
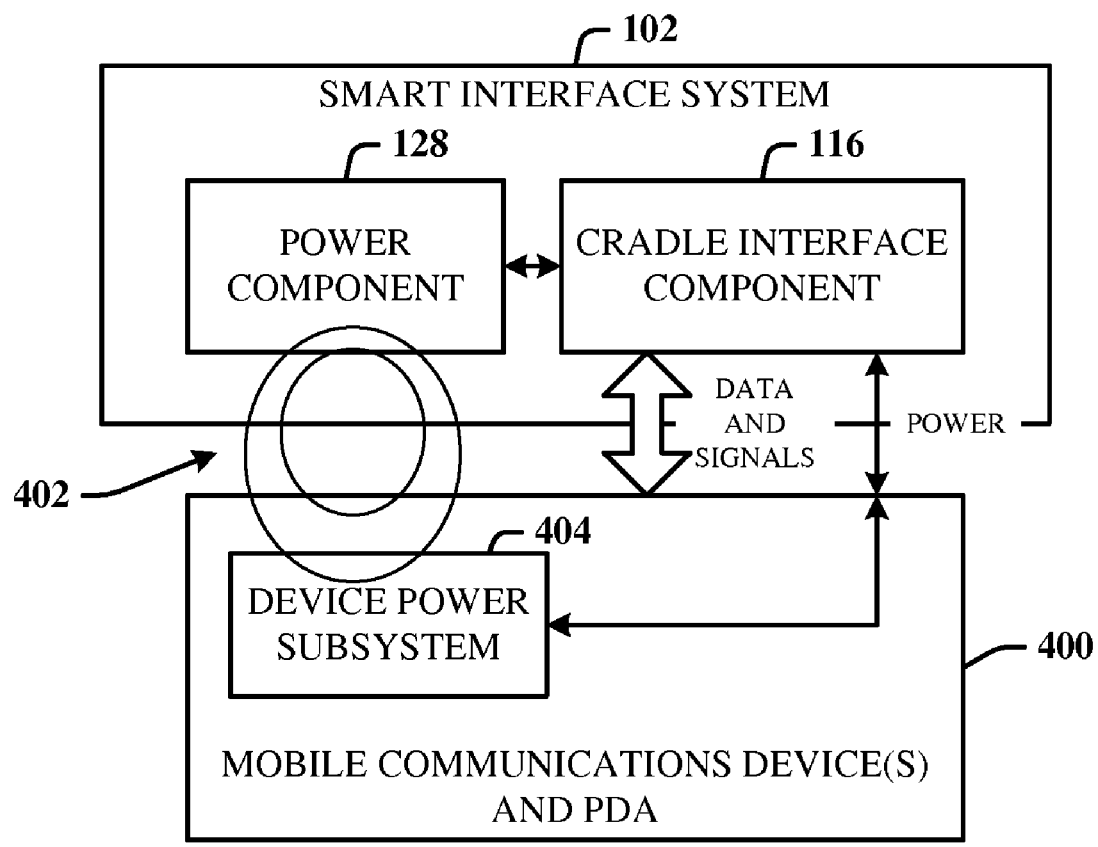
FIG. 4 illustrates a generalized cradle and mobile communications device interface for power, data and signals.

FIG. 4 illustrates a generalized cradle and mobile communications device interface for power, data and signals. The cradle interface component 116 can be standardized to the extent that the interface component 116 will accommodate a large number and type of mobile communication devices and PDAs 400. Typically, the interface component 116 includes connections for data and signals, as well as for power. As previously indicated, the smart system 102 includes the power component 128 that can power the devices 400 through the cradle interface component 116 and/or couple power into the devices 400 via induction field 402. Accordingly, a device power subsystem 404 for suitable devices 400 can receive external power through a wire connection of the cradle interface component 116 and/or inductive coupling directly from the power component 128 to the power subsystem 404.

Figure 5:
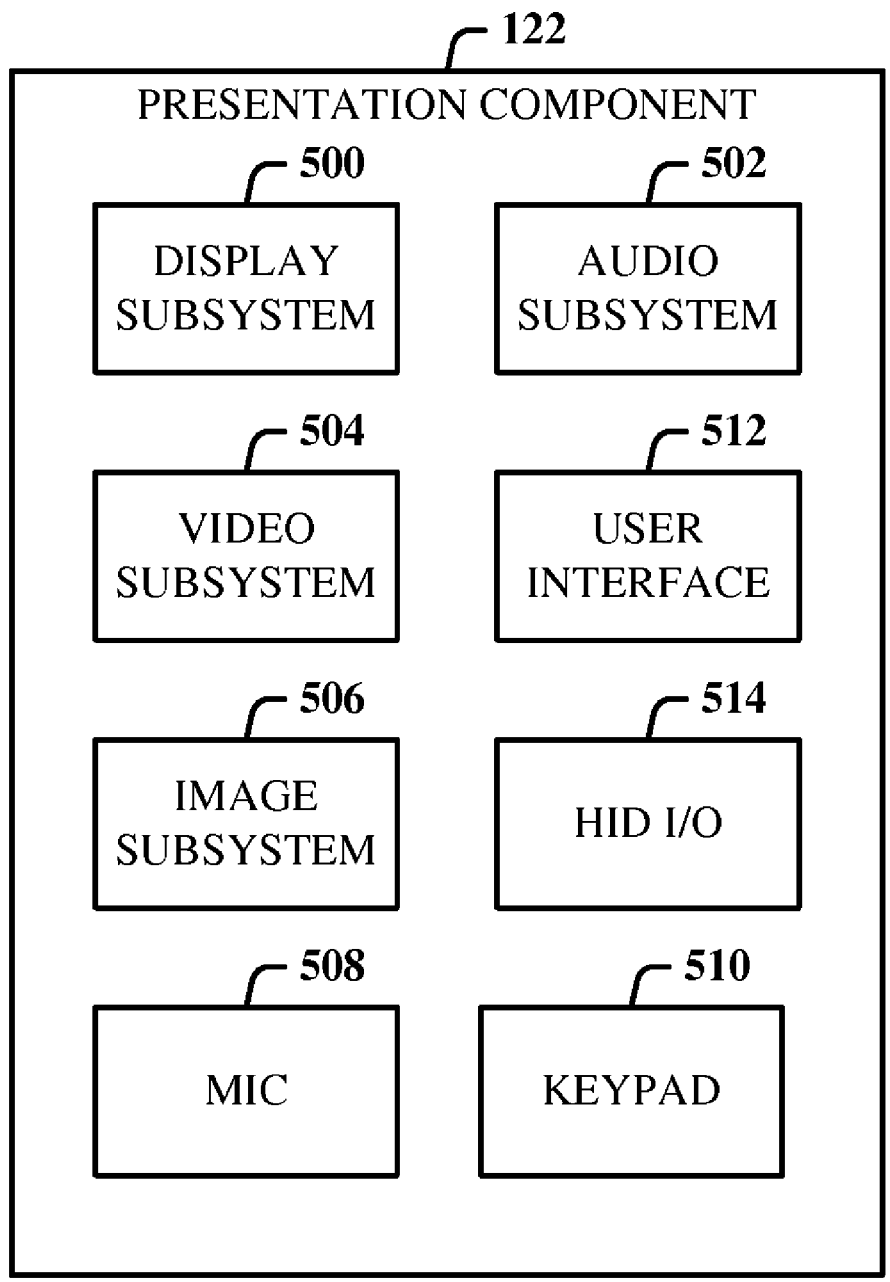
FIG. 5 illustrates a more detailed block diagram of the presentation component.

FIG. 5 illustrates a more detailed block diagram of the presentation component 122. The presentation component 122 includes support for the ways in which data and information can be presented, as well as interacted with. A display subsystem 500 can include support for a display of the smart system as well as interacting with the display interface circuits and logic for the operation of external displays. Auto-configuration can include not only the routing of display information from the mobile communications device to an external display, when the smart system detects and connects to the mobile communications device, but also associated with a possible change in behavior of the smart system display.

An audio subsystem 502 provides one or more audio speakers for the smart system 102 for the output of audio signals (e.g., music files, voice recordings, etc.) separate from or in lieu of the mobile communications device audio subsystem. The audio subsystem abstracts the complexity of different types of audio processing from the mobile communications device, thereby allowing the projection the mobile device audio into a larger set of speakers to which the smart cradle is connected. Example types of audio interfaces broadcast over Bluetooth or Wi-Fi.

The playback of audio files can be performed in combination with the programs/data component and processor/memory component of the smart system. Auto-configuration can include not only the routing of audio output from the mobile communications device to an external audio system (e.g., speakers, home system, computer speakers, etc.), when the smart system detects and connects to the mobile communications device, but also associated with a possible change in behavior of the smart system audio system.

For example, once connected, audio signals of the mobile communications device can be routed for output by the smart system or the external audio system. If the user receives a call when the mobile communications device is in the cradle, the voice signals can be auto-configured to mute the external audio system so that other users can not hear the voice signals; otherwise, the call can be made public to all available users such as for conferencing.

A video subsystem 504 provides for the playback and presentation of video files (e.g., music videos, clips, movies, etc.) via the smart system 102. Video clips downloaded from the mobile communications device can be played back on the smart system. Alternatively or in combination therewith, the video files can be played to an external video presentation system and the smart system for presentation.

Similarly, an image subsystem 506 supports the capture (e.g., camera) and presentation of image files (e.g., photos, webpage images, etc.). Images can be downloaded from the mobile communications device to the smart system for presentation. Alternatively or in combination therewith, the image files can be sent to an external image presentation system and the smart system for presentation.

The presentation component 122 can also include a microphone 508 for the input of voice signals or other audio input. This benefits use of the smart system for multi-user conferencing, for example, or recording of voice signals for a meeting, etc.

The presentation component 122 can also include user input devices such as a keypad 510 for interacting with the smart system for setup, configuration, adjustment of settings during operation, and data input, for example, as well as interacting with a user interface 512. Other HIDs 514 for I/O can be connected to the smart system for use with the mobile communications device, smart system and external systems such as keyboards, mice, touchpads, gesture systems, and so on.

Figure 6:
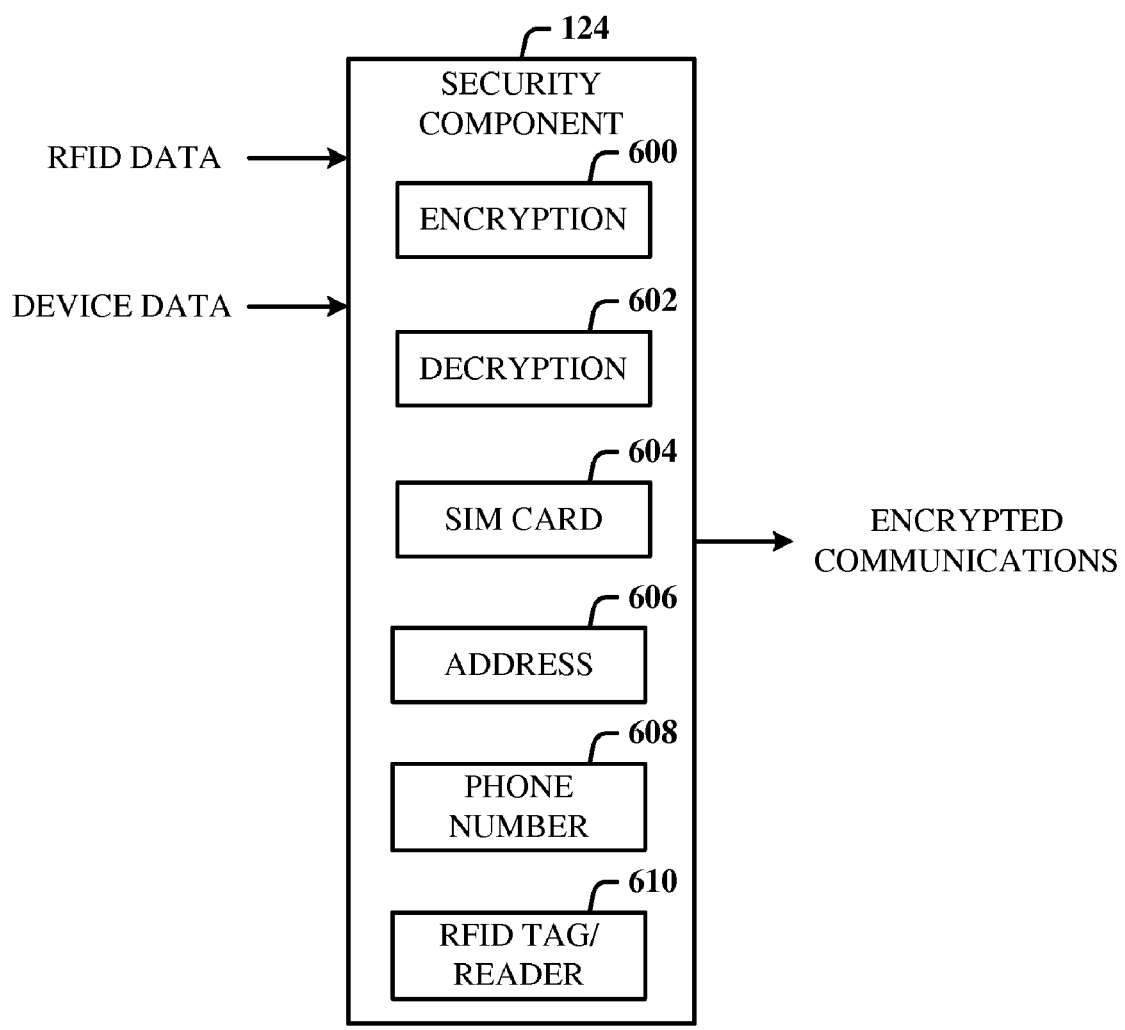
FIG. 6 illustrates more details with the security component for providing secure communications between the smart system and the mobile communications device.

FIG. 6 illustrates more details of the security component 124 for providing secure communications between the smart system and the mobile communications device. The security component 124 can include an encryption component 600 and a decryption component 602 for the corresponding encryption and decryption of data and/or signals using public and/or private key infrastructure.

Additionally, the security component 124 can include other information such as device data and/or smart system data that uniquely identifies the relationship between the device and the smart system. For example, a SIM (subscriber identity module) card 604 can be employed as part of the smart system. Similarly, the smart system can be assigned a unique address 606 (e.g., IP address) for network purposes. Additionally, the smart system can be assigned a phone number 608 for calling into the smart system. In other words, a user can call into the cradled mobile communications device and/or the smart system. The SIM card 604, address 606 and phone number 608 allows the user to remotely access the services that are provided by the smart system, provision data into the smart system, and retrieve or store data into the smart system.

As previously indicated, RFID technology can be employed such that RFID data is used as a means for encrypting and decrypting data and signals. Accordingly, an RFID tag/reader subsystem 610 can be employed. More specifically, the smart system can employ an RFID tag in the smart system. A device (e.g., PDA, mobile communications device, game controller, etc.) can then include an RFID reader that activates the tag to read data stored therein. The data can include code for encrypting communications between the smart system and the device. Alternatively, the smart system can include the RFID reader such that when the device is brought into radio range, the RFID tag of the device is read to establish secure communications.

Figure 7:
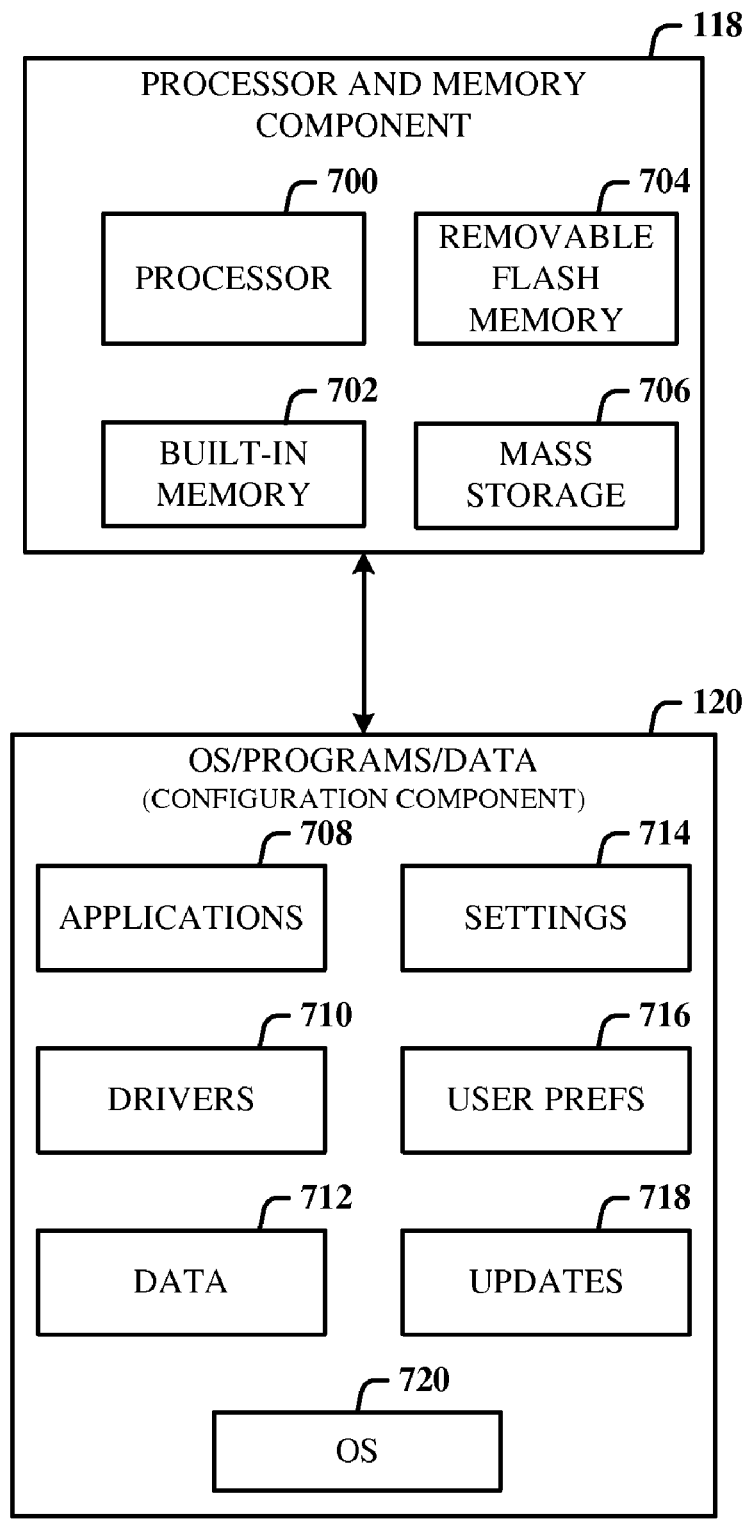
FIG. 7 illustrates details associated with the processor and memory component and programs/data component.

FIG. 7 illustrates details associated with the processor and memory component 118 and programs/data component 120. The processor and memory component 118 includes a processor (e.g., digital signal processor) for processing onboard data, instructions, signals, and programs. The processor and memory component 118 can further include built-in volatile and nonvolatile memory 702 (e.g., ROM, static RAM, flash memory), removable memory 704 (e.g., flash memory cards) and mass storage systems 706 (e.g., micro-drives, SSDs, flash memory, etc.).

The programs/data component 120 can include applications 708 (e.g., audio, video, imaging, text messaging, document creation, browser, email, etc.), and drivers 710 for interfacing to functionality of the mobile communications device and external systems as well as smart system components and subsystems. Data 712 can also be generated and stored in the memory, including but not limited to logs of smart system use, for example. Settings 714 for the smart system, connected external systems and mobile communications devices can also be generated and stored in the smart system. User preferences 716 for interacting with the smart system and external systems (e.g., a display) can also be generated and stored. Updates 718 for smart system components and subsystems can also be part of the programs and data component 120. Updates can be performed by the smart system for the smart system and/or for the mobile communications device.

An OS 720 provides the basic control, file management, memory management, and application management (e.g., browsing) of the smart interface system 102. For example, the smart system 102 can provide browsing capability and other computing functionality itself, rather than via the mobile communications device. Thus, a user can use a keyboard and mouse, for example, to the "surf the web" using only the smart interface system 102.

Unique functionality of the smart system includes backup and provisioning of the mobile communications device (e.g., phone). The smart system can backup data of the phone and store it in internal memory. The backup can occur automatically each time the mobile communications device is plugged into the cradle. Additionally, the smart system can provision a new phone with setting, contacts, media, and data stored.

The smart system can receive and store data from the network on behalf of the phone when the phone is not connected to the smart cradle (a proxy device). This serves as an offline cache for updating the phone. Media, phone settings and user personal data can be updated from cache memory automatically by the smart system.

The smart system can be accessed remotely and also "phone home" to check for and receive new updates or software upgrades. Moreover, the smart system can be provisioned by the phone that is connected to it, or the smart system can receive provisioning data from other smart systems in the home or office.

Figure 8:
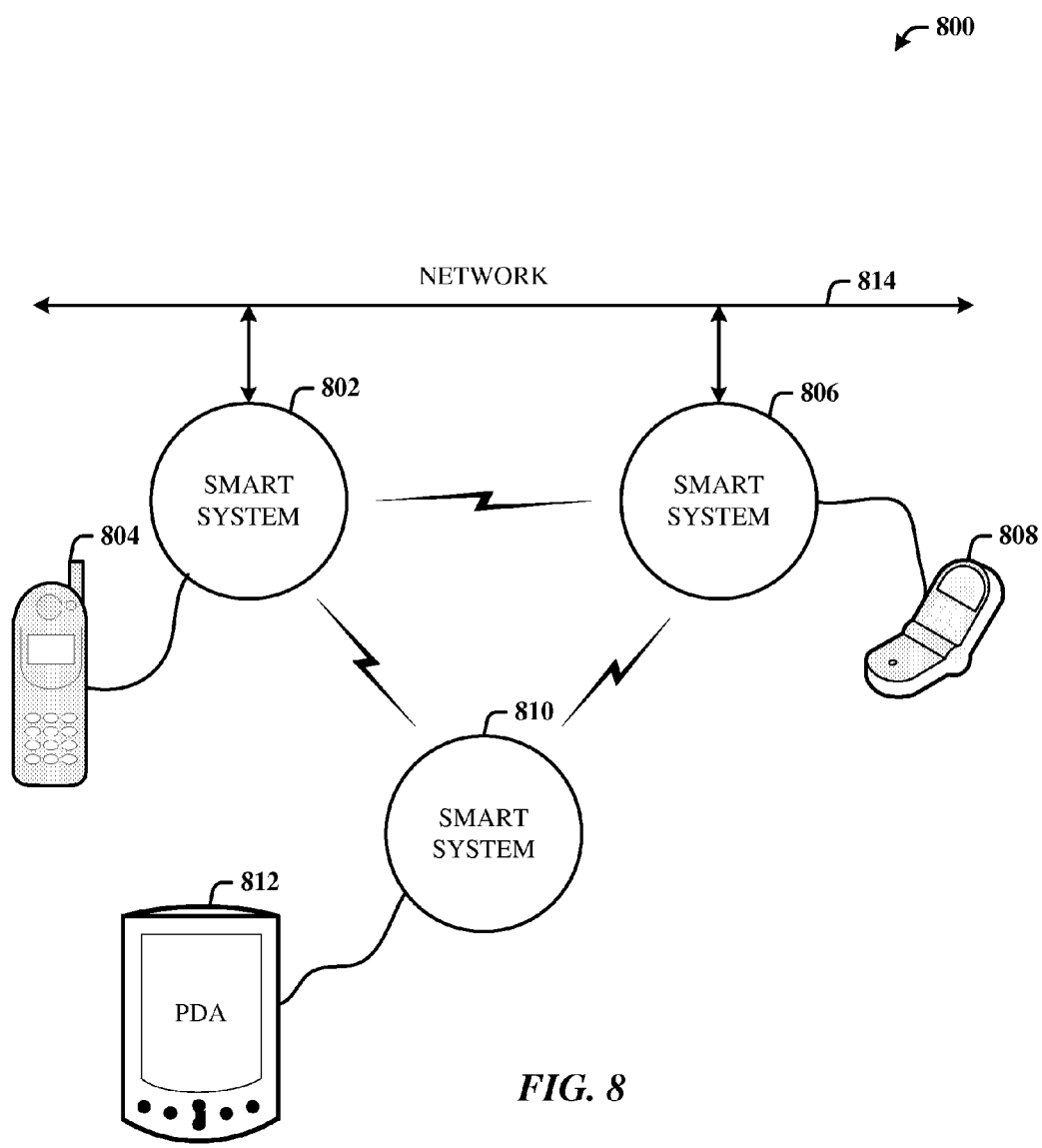
FIG. 8 illustrates a smart system network for interconnecting smart systems and other devices for data exchange.

FIG. 8 illustrates a smart system network 800 depicting that smart systems can be connected such that other devices (e.g., phones) can communicate data, for example, over a network for data exchange. Here, three smart systems are employed: a first smart system 802 with a tethered first cell phone 804, a second smart system 806 with a tethered second cell phone 808, and a third smart system 810 with a tethered PDA 812. The first and second smart systems (802 and 806) communicate directly with a network 814. The third smart system 810 can communicate indirectly to the network 814 wirelessly through either or both of the first smart system 802 or/and the second smart system 806. Moreover, the first and second smart systems (802 and 806) can communicate (e.g., Bluetooth) with each other through the network 814 and/or wirelessly.

The data connection capability of the smart system allows for exchanging data between different smart systems and computers, for example. This data pipeline can be used to synchronize content and settings into the smart systems, and provisioning of the smart systems with media and contacts. Additionally, the data connection capability allows the phones (804 and 808) and PDA 812 to be connected to other sources of data and media such as gaming systems (e.g., Xbox) or other gaming and media storage devices. In another example, a game controller, MP3 player and/or MP4 player can be connected to the smart system rather than the mobile communications devices or in combination therewith. Moreover, this allows the phones (804 and 808) and PDA 812 to be automatically provisioned with the users preferred songs that are stored on the user's computer or gaming system, the contacts that are stored on the user's computer and the settings for the phones (804 and 808) and PDA 812 that are stored on the network.

The smart system can also be used to command and control of different connected devices. Using the universal plug-n-play (UPnP) protocol, for example, the smart system can control peripheral devices and allow the phones (804 and 808) and PDA 812 to access peripheral device functionality.

Additionally, the data connector capability can be used to exchange and share data and media between two different phones (e.g., 804 and 808), or a phone 804 and the PDA 812, for example. If there are multiple interconnected smart systems in a home or business, and the smart systems can provide a conduit to exchange data between different phones and other systems. Alternatively, a smart system 802 can synchronize content from the first phone 804 and store the content locally in memory, and then transfer that content to the second phone 808 when the second phone 808 connects (e.g., cradled) in the second smart system 806 or tethers to the first smart system 802.

Figure 9:
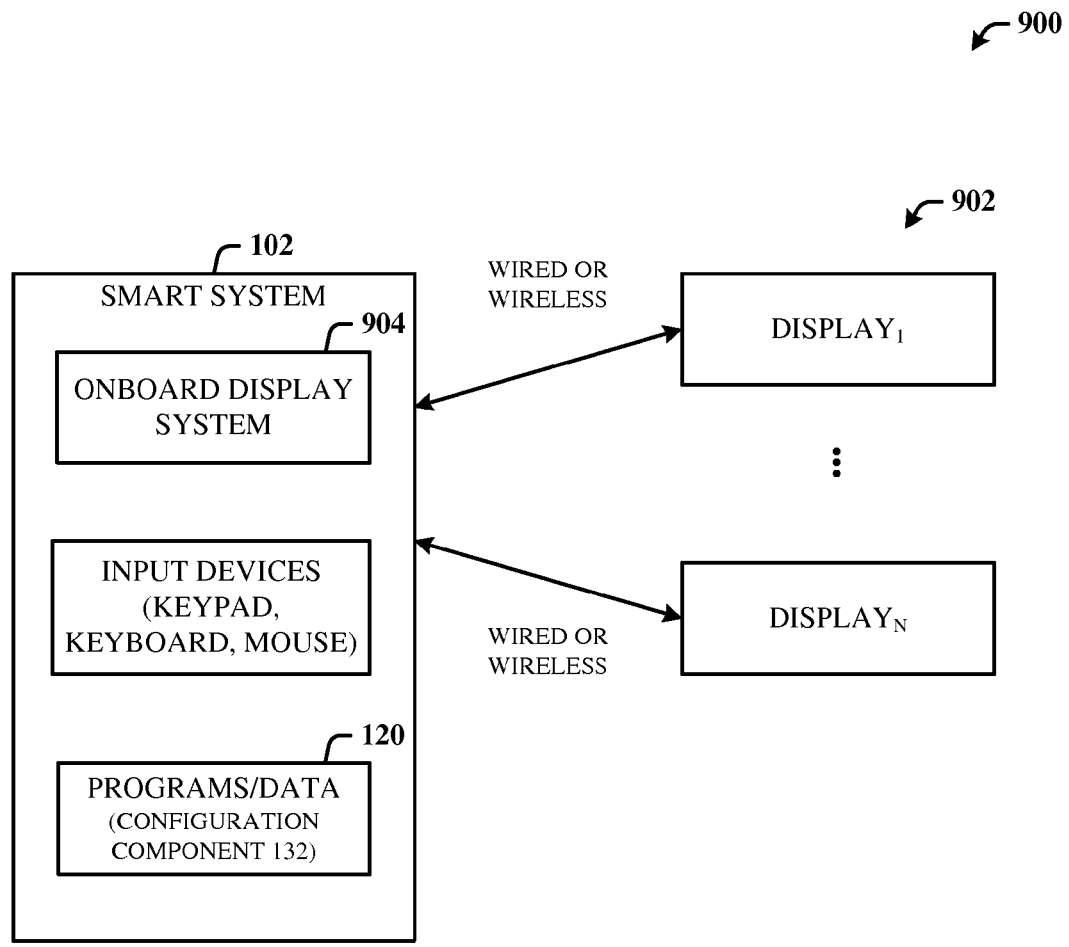
FIG. 9 illustrates the use of auxiliary displays via the smart system.

FIG. 9 illustrates the use of auxiliary displays 902 via the smart system 102. The smart system 102 provides the capability to manage external displays 902 for the mobile communications device and/or PDA for the user in the following ways. The smart system 102 includes the part of the configuration component embodied in the programs/data component 120. The configuration component provides functionality to auto-detect one or more large displays 902 being connected, and functionality for automatically recognizing the size and quality of the display and for displaying appropriate information on the one or more large displays 902.

Additionally, the configuration component of the smart system 102 includes functionality for auto-detecting the first time use and walk-through of the user through a series of steps to configure the external systems (e.g., the one or more large displays), and for help and training media (e.g., voice, video) being stored and displayed on a large display and small display, concurrently or separately, to guide the user to through smart system and external systems setup, and for learning the capabilities of the smart system and connected systems.

The configuration component also provides the functionality to detect the screen size, resolution, orientation and previous user preferences to automatically adjust the content of the screen and use appropriate size, resolution and fonts to optimize use of the available screen space, for example. The configuration component supports the ability of the smart system 102 to remember the user preferences related to, for example, content control (content that should or should not be displayed), which application on the smart system 102 can use the large display, during which time window the large display can be deactivated, large display capability such as size, resolution and orientation, and output signal type such as PAL (phase alternating line) or NTSC (national television system committee), and color compensation for the large display based on ambient light.

The configuration component also serves as the mechanism for switching the screen resolution and size and orientation, and serves up the communication steps and protocols to inform a user of the screen changes. The configuration component provides the functionality to automatically detect the most optimal display(s) to use, to display phone applications fully on the large display(s), partially on the large display(s), the smart system display, and/or the mobile communications device display, and to detect the audio capability of the large display(s) and when audio should be routed to the large display(s) screen.

A smart system 102 can be connected to the one or many large displays 902 through a wired and/or wireless link. The wired and/or wireless link can be embedded into the smart system 102, an add-on device to the smart system 102, or as one of the external systems; however, the functionality remains the same. That is, the smart system 102 can either be physically connected to the large display or connected wirelessly.

When the auxiliary display(s) 902 are first connected to the smart system 102, the smart system 102 can query for the display type and learn about the capabilities of the display, for example, resolution and orientation (e.g., landscape, portrait). Once these setting have been determined, these display settings can be saved in the smart system 102 as settings and/or user preferences, for example, for that display. This makes the recognition and determination of auxiliary device capabilities much faster the next time that external device (e.g., display) is connected. The display detection can be based on hardware detection or manually specified by the user.

When the smart system 102 connects to a large display (e.g., a TV), for example, the smart system display 904 (e.g., the presentation component 122) can be used to present a set of options and information to guide the user to correctly connect the smart system to the large display.

As previously indicated, the user can store settings in user profiles that are selectable for a given environment (e.g., home or office). As a result of the onboard application storage and execution capability of the smart system, all external systems connecting to the smart system 102 can be detected at some level. Thus, by detecting one or more of the externals systems (e.g., a cluster) connected, the smart system can automatically select the user profile to employ. For example, if a keyboard, mouse, and TV are detected as connected, the smart system 102 infer that the user is at home, thereby selecting a home profile that auto-configures the TV for user viewing. Alternatively, if an input device to the smart system is a touchpad or gesture device and a smaller display, the smart system infer that the user is on travel or at the office using a laptop, and hence, a suitable profile can be selected and executed to provided the settings and configuration associated with that profile and environment. Additionally, a different profile can then be selected and employed that configures the laptop display for viewing.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
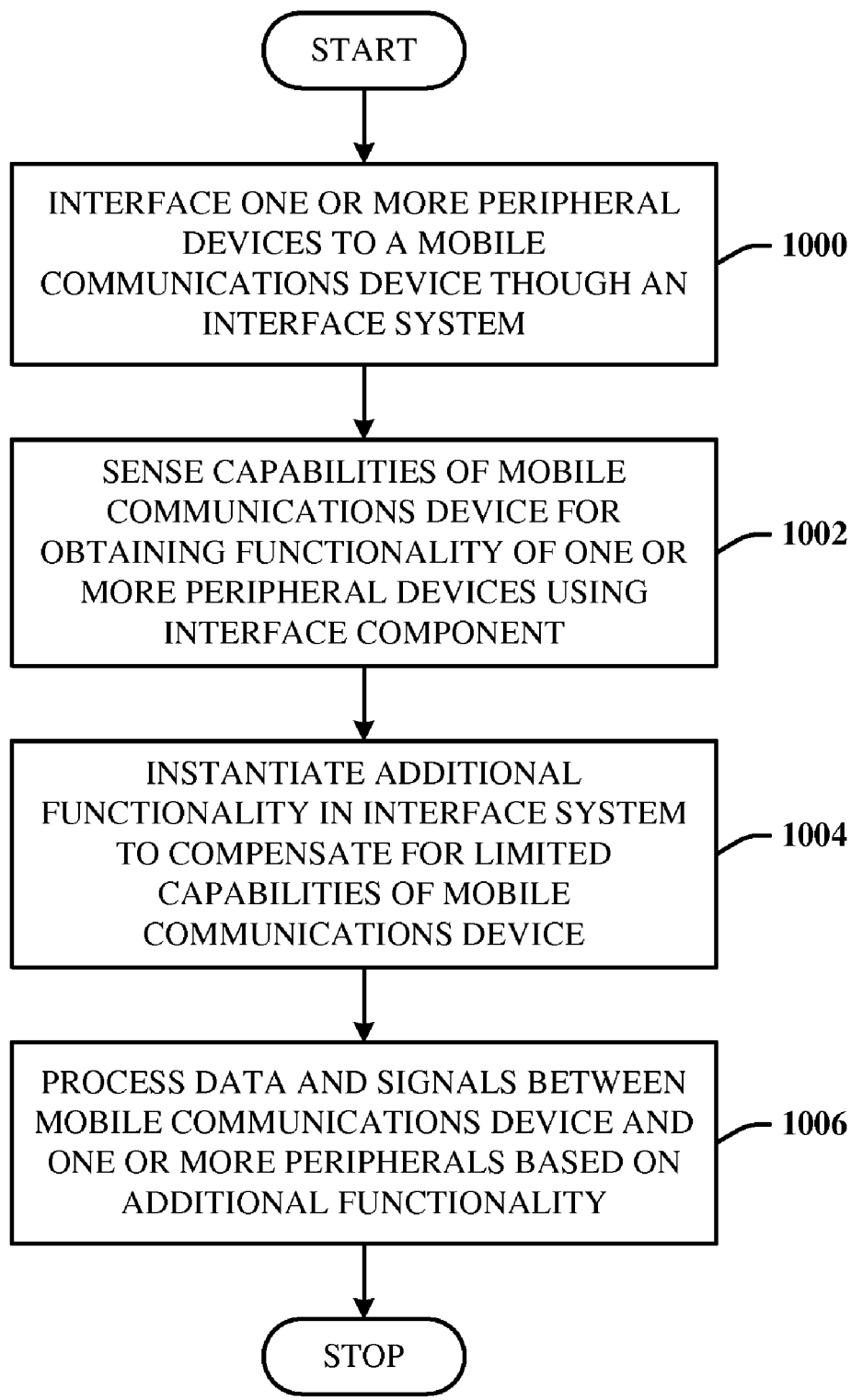
FIG. 10 illustrates a method of providing connectivity between a mobile communications device and peripheral devices.

FIG. 10 illustrates a method of providing connectivity between a mobile communications device and peripheral devices. At 1000, one or more peripheral devices interface to a mobile communications device though an interface system. At 1002, capabilities of the mobile communications device for obtaining functionality of the one or more peripheral devices are sensed using the interface system. At 1004, additional functionality is instantiated in the interface system to compensate for limited capabilities of the mobile communications device. At 1006, data and signals are processed between the mobile communications device and the one or more peripheral devices based on the additional functionality.

Figure 11:
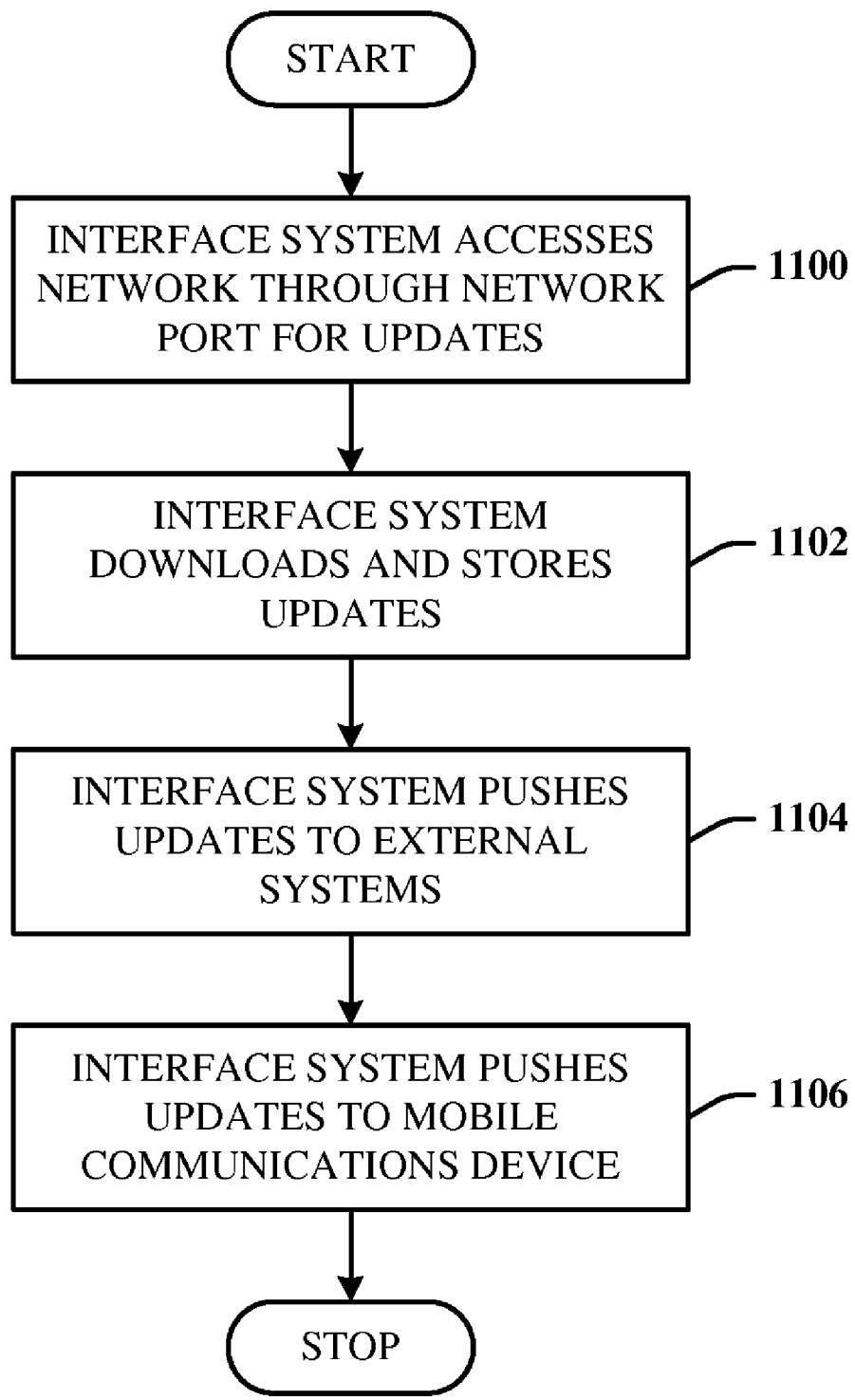
FIG. 11 illustrates a method of obtaining and providing updates via the interface system.

FIG. 11 illustrates a method of obtaining and providing updates via the interface system. At 1100, the interface system accesses a network for updates through a network port. At 1102, the interface system downloads and stores the updates. At 1104, the interface system pushes updates to one or more external systems (e.g., peripheral devices). At 1106, the interface system pushes updates to the mobile communications device.

Figure 12:
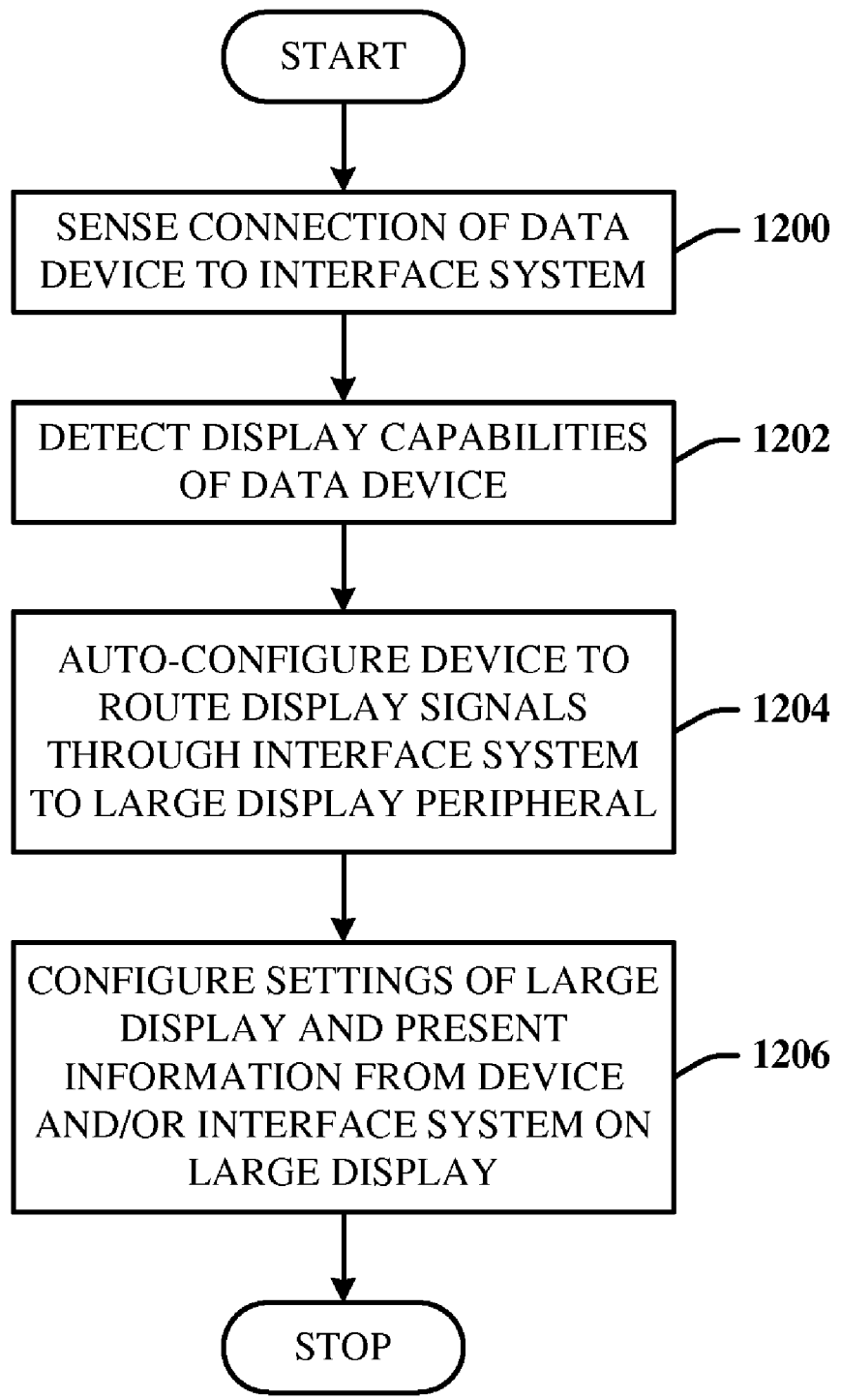
FIG. 12 illustrates a method of managing a display peripheral for a data device.

FIG. 12 illustrates a method of managing a display peripheral for a data device. At 1200, the interface system senses that the data device has connected. At 1202, the interface system senses the display capabilities of the data device. At 1204, the interface system auto-configures the data device or route display signals through the interface system to a large display peripheral. At 1206, settings of the large display are configured by the interface system, and information from the data device and/or interface system is presented on the large display.

Figure 13:
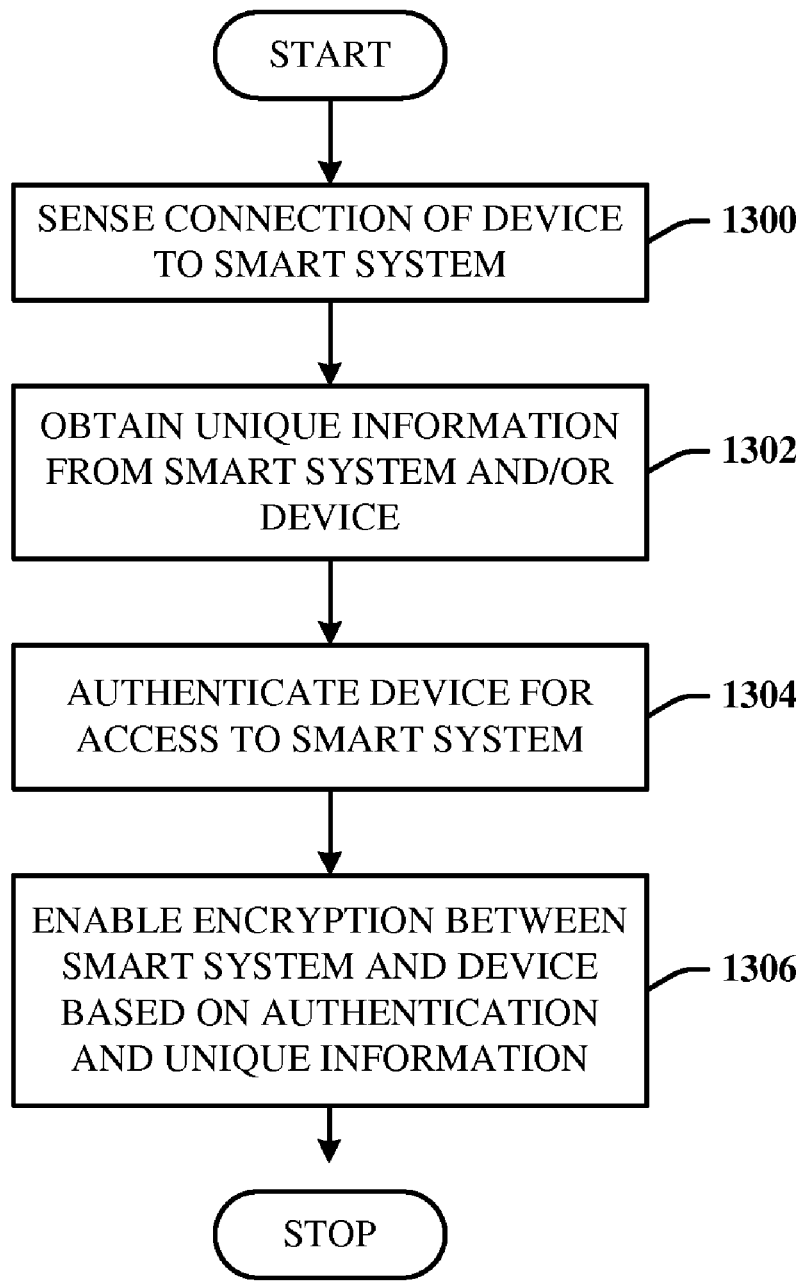
FIG. 13 illustrates a method of providing secure communications.

FIG. 13 illustrates a method of providing secure communications. At 1300, the smart system detects connection of the device. At 1302, unique information is obtained from the smart system and/or the device. At 1304, the device is authenticated for access to the smart system. At 1306, encryption of communications between the device and the smart system is enabled based on the authentication and the unique information.

Figure 14:
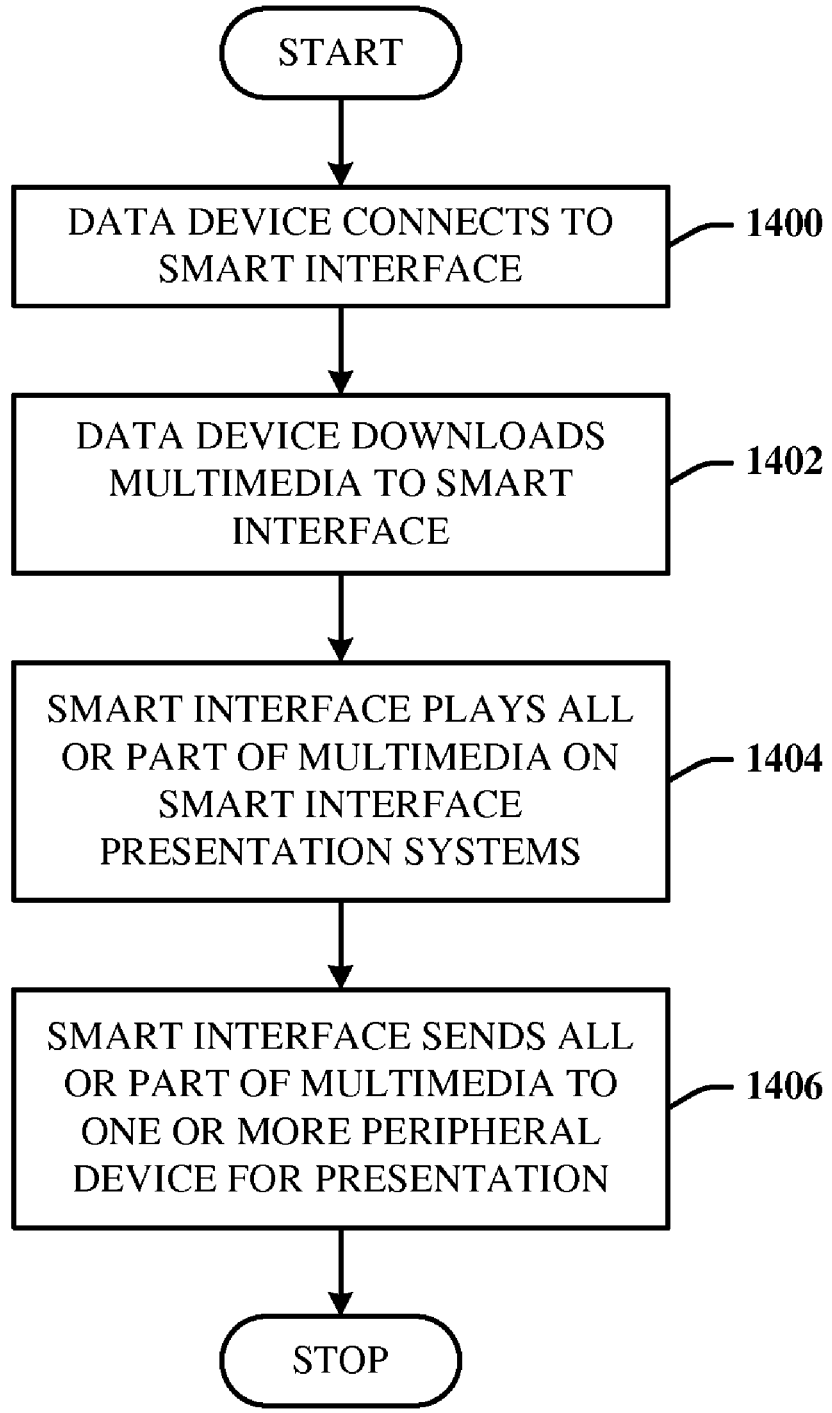
FIG. 14 illustrates a method of processing multimedia based on the smart interface.

FIG. 14 illustrates a method of processing multimedia based on the smart interface. At 1400, the data device connects to the smart interface. At 1402, the data device downloads multimedia the smart interface. At 1404, the smart interface plays all or part of the multimedia via presentation systems of the smart interface. At 1406, the smart device sends all or part of the multimedia to one or more peripheral devices for presentation.

Figure 15:
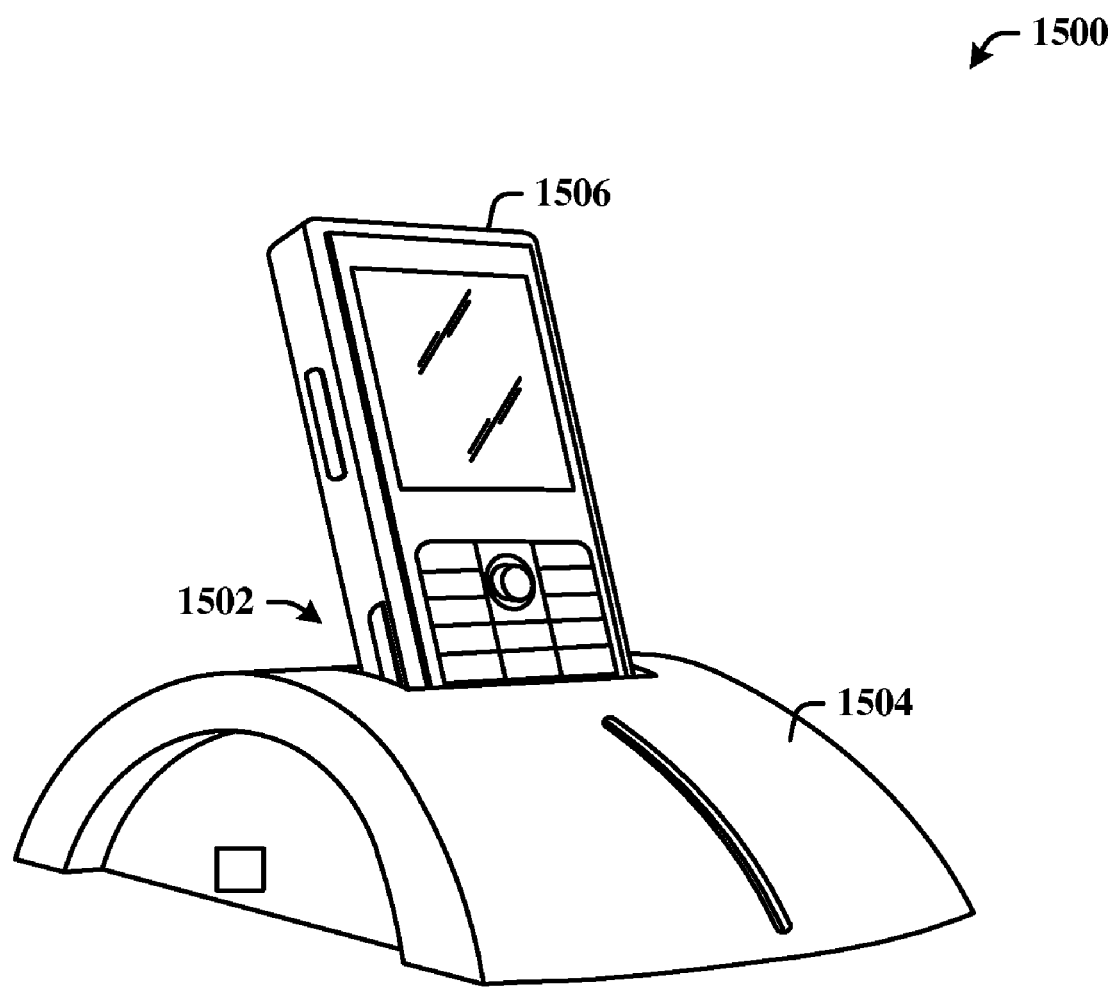
FIG. 15 illustrates a perspective of an exemplary smart interface system that includes a cradle for receiving a mobile communications device.

FIG. 15 illustrates a perspective of an exemplary smart interface system 1500 that includes a cradle 1502 in a smart system housing 1504 for receiving a mobile communications device 1506.

Figure 16:
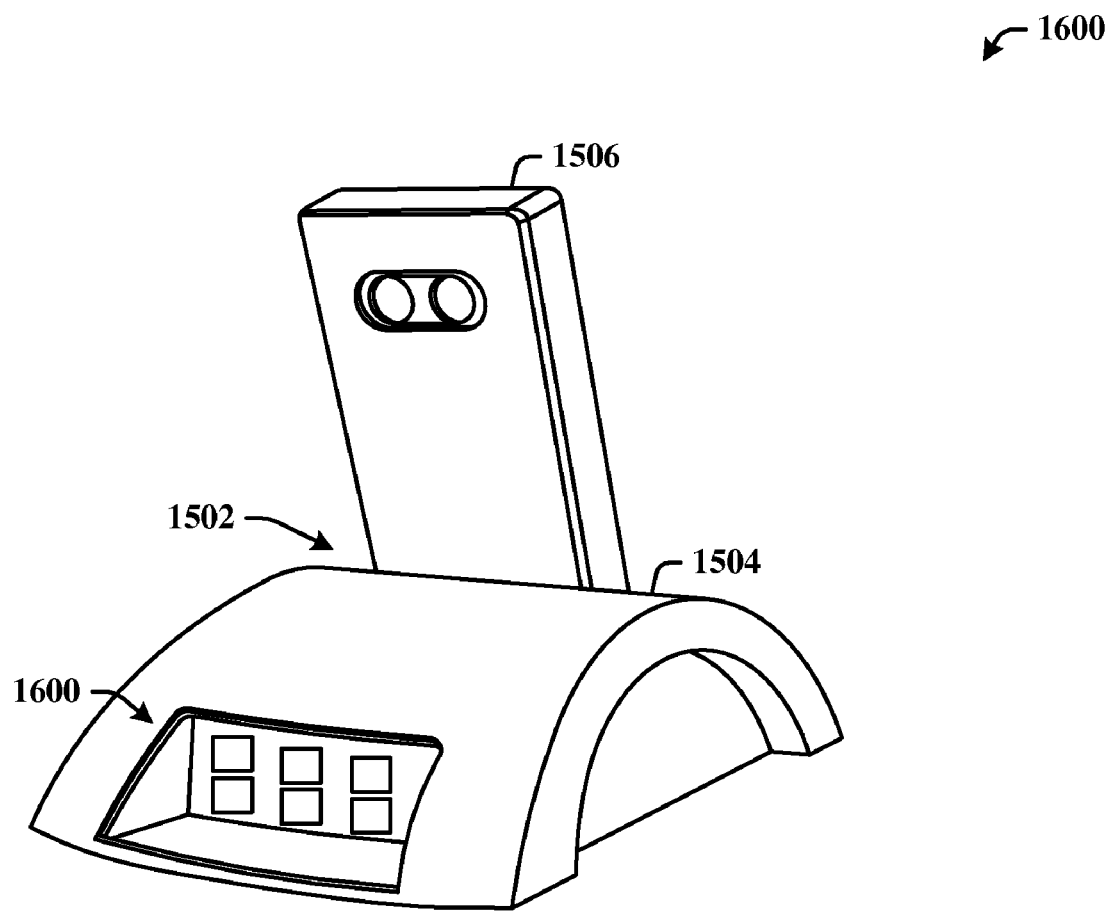
FIG. 16 illustrates a different perspective of an exemplary smart interface system that includes a cradle for receiving a mobile communications device.

FIG. 16 illustrates a different perspective of an exemplary smart interface system 1500 that includes the cradle 1502 in the housing 1504 for receiving the mobile communications device 1506. The system 1500 also shows an external connector interface 1600 for USB, video, and network connectors, for example.

Figure 17:
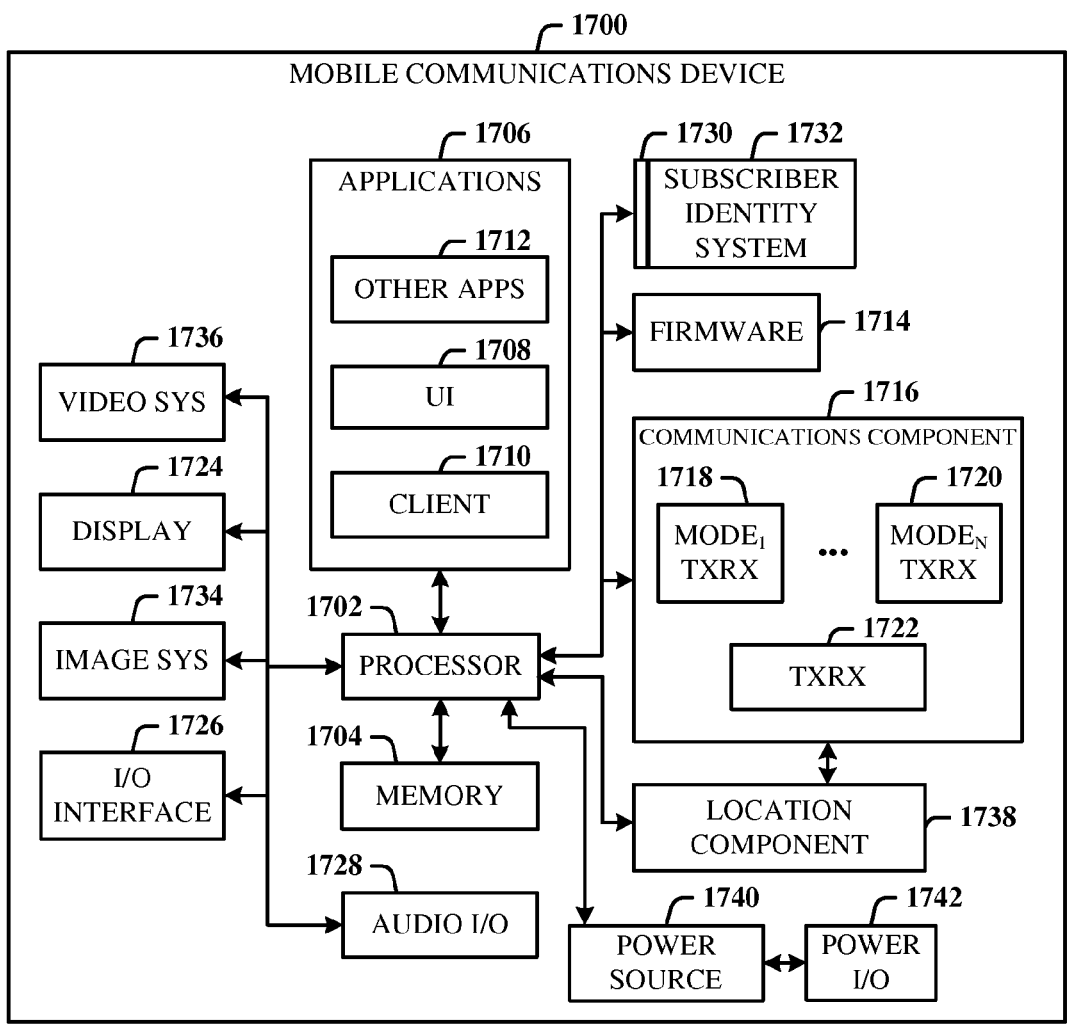
FIG. 17 illustrates a schematic block diagram of an exemplary multimode mobile communications device operable to interact with the smart system and associated functionality.

FIG. 17 illustrates a schematic block diagram of an exemplary multimode mobile communications device 1700 operable to interact with the smart system and associated functionality. In order to provide additional context for various aspects thereof, FIG. 17 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The mobile device 1700 (e.g., a cell phone) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the mobile device systems.

The device 1700 includes a processor 1702 for controlling and processing onboard operations and functions. A memory 1704 interfaces to the processor 1702 for the storage of data and one or more applications 1706 (e.g., a video player software, user feedback component software, etc.).

The applications 1706 can include drivers and support programs for interfacing to the smart system 102. For example, the applications 1706 will allow the smart system 102 to analyze the capabilities of the mobile device 1700, and then adjust the behavior of the device 1700 and/or the smart system 102 accordingly to interface through the smart system 102 to the connected peripherals, networks and/or displays.

The applications 1706 can also include a user interface (UI) application 1708 that operates with a client 1710 (e.g., operating system) to facilitate user interaction with handset functionality and data, for example, answering/initiating calls, entering/deleting data, configuring settings, address book manipulation, multimode interaction, etc. The applications 1706 can include other applications 1712 that came installed with the handset 1706 and/or can be installed as add-ons or plug-ins to the client 1710 and/or UI 1708, for example, or for other purposes (e.g., processor, firmware, etc.).

The other applications 1712 can include voice recognition of predetermined voice commands that facilitate user control, call voice processing, voice recording, messaging, e-mail processing, video processing, image processing, music play, as well as subsystems or components described infra. Some of the applications 1706 can be stored in the memory 1704 and/or in a firmware 1714, and executed by the processor 1702 from either or both the memory 1704 or/and the firmware 1714. The firmware 1714 can also store code for execution in power-up initialization and control during normal operation of the device 1700.

A communications component 1716 can interface to the processor 1702 to facilitate wired/wireless communications with external systems, for example, cellular networks, VoIP (voice-over-IP) networks, local wireless networks or personal wireless networks such as Wi-Fi, Wi-Max, and so on. Here, the communications component 1716 can also include a multimode communications subsystem for providing cellular communications via different cellular technologies. For example, a first cellular transceiver 1718 (e.g., GSM) can be one mode and an Nth transceiver 1720 can provide cellular communications via an Nth cellular network (e.g., UMTS), where N is a positive integer. The communications component 1716 can also include a transceiver 1722 for unlicensed communications (e.g., Wi-Fi, Wi-Max, Bluetooth, etc.) for corresponding communications. The communications component 1716 can also facilitate communications reception from terrestrial radio networks (e.g., broadcast), digital satellite radio networks, and Internet-based radio services networks.

The device 1700 can process IP data traffic via the communications component 1716 to accommodate IP traffic from an IP network such as, for example, the Internet, a corporate intranet, a home broadband network, a personal area network, etc., via an ISP or broadband cable provider. Thus, VoIP traffic can be utilized by the device 1700 and IP-based multimedia content can be received in an encoded and/or decoded format.

The device 1700 includes a display 1724 for displaying multimedia that include text, images, video, telephony functions (e.g., a Caller ID function), setup functions, menus, etc. The display 1724 can also accommodate the presentation of multimedia content (e.g., music metadata, messages, wallpaper, graphics, etc.).

An input/output (I/O) interface 1726 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 1726 can be utilized for updating and/or troubleshooting the device 1700, for example.

Audio capabilities can be provided via an audio I/O component 1728, which can include a speaker for the output of audio signals related to, for example, indication that the user pressed the proper key or key combination to initiate the user feedback signal, call signals, music, etc. The audio I/O component 1728 also facilitates the input of audio signals via a microphone to record data and/or telephony voice data, and for inputting voice signals for telephone conversations.

The device 1700 can include a slot interface 1730 for accommodating a subscriber identity system 1732 that can accommodate a SIM or universal SIM (USIM), and interfacing the subscriber identity system 1732 with the processor 1702. However, it is to be appreciated that the subscriber identity system 1732 can be manufactured into the device 1700 and updated by downloading data and software thereinto, such as the access information described herein.

An image capture and processing system 1734 (e.g., a camera) can be provided for decoding encoded image content. Additionally, as indicated, photos can be obtained via an associated image capture subsystem of the image system 1734. The device 1700 can also include a video component 1736 for processing video content received and, for recording and transmitting video content.

Optionally, a geolocation component 1738 (e.g., GPS-global positioning system) facilitates receiving geolocation signals (e.g., from satellites via the communications component 1716) that define the location of the device 1700. Alternatively, or in combination therewith, the geolocation component 1738 can facilitate triangulation processing for locating the device 1700.

The device 1700 also includes a power source 1740 in the form of batteries and/or an AC power subsystem, which power source 1740 can interface to an external power system or charging equipment (not shown) via a power I/O component 1742.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The following discussion is intended to provide a brief, general description of suitable processor-based devices or systems in which the various aspects can be implemented. Those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other processor-based configurations, including single-processor or multiprocessor systems, as well as personal computers, hand-held computing devices, microprocessor-based or programmable consumer electronics, and the like, each of which can be operatively coupled to one or more associated devices.

A processor-based system typically includes a variety of computer-readable media. Computer-readable media can be any available media that can be accessed and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

The system is operable to communicate with any wireless devices or entities operatively disposed in wireless communication, for example, a printer, scanner, desktop and/or portable computer, portable data assistant, communications satellite, other hubs, mobile phones, any piece of equipment or location associated with a wirelessly detectable tag (e.g., a kiosk, news stand, restroom), and telephone. This includes at least Wi-Fi, WiMax, and Bluetooth™ wireless technologies, for example. Thus, the communication can be a predefined structure as with a conventional network or simply an ad hoc communication between at least two devices.

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wire Ethernet networks used in many offices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A smart interface system for providing peripheral device operability with a mobile communications device, the smart interface system comprising:
    an external interface component comprising a network interface and a universal serial bus (USB) hub for interfacing a mobile communications device to peripheral devices and a network;
    a communications component for communicating data and signals between the mobile communications device and, the peripheral devices and the network;
    a processor and memory component for storing and executing an operating system (OS) and one or more applications, the OS and one or more applications for processing instructions and signals in support of communications by the smart interface system with the mobile communications device and, the peripheral devices and the network; and
    a configuration component for automatically sensing the mobile communications device, and establishing operability between the mobile communications device and, the peripheral devices and the network;
    the external interface component, the communications component, the processor and memory component, and the configuration component as components of a smart core that simulates a personal computer (PC) interface for the mobile communications device to the peripheral devices and the network in which the smart core queries the mobile communications device for a device configuration that invokes a self-configuration of the smart interface system to match capability with the mobile communications device, and the smart core installs at least one of an application or a driver on the mobile communications device to simulate the PC interface for the peripheral devices and the network in which the mobile communications device is self-configured to match capability with the peripheral devices and the network.

2. The system of claim 1, further comprising a cradle interface component for receiving the mobile communications device via a mechanical interface and facilitating communication of data and signals between the mobile communications device and, the peripheral devices and the network.

3. The system of claim 1, wherein the mobile communications device is a cell phone, or a personal digital assistant device with mobile communications functionality.

4. The system of claim 1, wherein the network interface facilitates digital communications over an Internet protocol (IPS) network.

5. The system of claim 1, wherein the configuration component automatically triggers the mobile communications device to operate with the peripheral devices according to a predetermined configuration.

6. The system of claim 1, further comprising a security component for providing encrypted communications with the mobile communications device.

7. The system of claim 1, further comprising a presentation component for presenting one or more of text, audio, images and video based on capabilities of the mobile communications device and the peripheral devices.

8. The system of claim 1, wherein the configuration component automatically connects to the network to obtain updates for updating the smart interface system OS and one or more applications, and the mobile communications device.

9. The system of claim 1, wherein the communications component facilitates wireless communications between the smart interface system and the mobile communications device.

10. The system of claim 1, wherein the mobile communications device exchanges data with another mobile communications device via the smart interface device.

11. A smart interface system for providing peripheral device operability with a mobile phone, the smart interface system comprising:
    an external interface component comprising a network interface and a USB hub for interfacing the mobile phone to peripheral devices and a network;
    a communications component for communicating data and signals between the mobile phone and, the peripheral devices and the network;
    a processor and memory component for storing and executing an OS and an application in support of communications between the mobile phone, the peripheral devices, and the network;
    a presentation component for presenting one or more of text, audio, images, and video based on capabilities of the mobile phone and the peripheral devices;
    a cradle interface component for receiving the mobile phone via an interface and facilitating communication of data and signals between the mobile phone, the peripheral devices, and the network; and
    a configuration component that detects connectivity of the mobile phone to the smart interface system and automatically installs at least one of an application or a driver to the mobile phone which auto-configures the mobile phone to facilitate interaction with the peripheral devices and the network.

12. The system of claim 11, wherein the configuration component automatically connects the smart interface system to the network, which is an IP network, to download and store updates for updating the smart interface system, independent of the mobile phone being connected to the smart interface system.

13. The system of claim 11, wherein the configuration component automatically triggers the mobile phone to operate with the peripheral devices according to a predetermined configuration.

14. The system of claim 11, wherein the OS and application facilitate, memory management and browsing of the network via the smart interface system.

15. A method of providing connectivity between a mobile communications device and peripheral devices, comprising:
    interfacing one or more peripheral devices to a mobile communications device through an interface system;
    querying the mobile communications device to identify a capability of the mobile communications device;
    installing a driver to the mobile communications device based on the identified capability of the mobile communications device in which the driver enables connectivity to the peripheral devices; and
    simulating a PC interface based upon the capability of the mobile communications device and the installed driver in order to enable data communication between the mobile communications device and the peripheral devices.

16. The method of claim 15, wherein the interface system includes a USB hub for interfacing USB devices, an IP network interface for interfacing to an IP network, and a graphics port for interfacing to a display.

17. The method of claim 15, further comprising storing configuration information in the interface system for interfacing the one or more peripheral devices to a cell phone, a portable digital assistant (PDA), and a game controller.

18. The method of claim 15, further comprising triggering different behavior in the mobile communications device based on the one or more peripherals connected to the interface system.

19. The method of claim 15, further comprising invoking a secure connection between the mobile communications device and the interface system.

20. The method of claim 15, further comprising presenting media via the interface system based on the capabilities sensed in the mobile communications device.

* * * * *